(12) United States Patent
van Hoff et al.

(10) Patent No.: US 6,272,536 B1
(45) Date of Patent: Aug. 7, 2001

(54) SYSTEM AND METHOD FOR THE DISTRIBUTION OF CODE AND DATA

(75) Inventors: Arthur A van Hoff, Mountain View; Jonathan Payne, Sunnyvale; Sami Shaio, Palo Alto, all of CA (US)

(73) Assignee: Marimba, Inc., Mountain View, CA (US)

( * ) Notice: Subject to any disclaimer, the term of this patent is extended or adjusted under 35 U.S.C. 154(b) by 0 days.

(21) Appl. No.: 09/231,322

(22) Filed: Jan. 13, 1999

Related U.S. Application Data

(63) Continuation of application No. 08/690,257, filed on Jul. 24, 1996, now Pat. No. 5,919,247.

(51) Int. Cl.⁷ .................................................. G06F 15/173
(52) U.S. Cl. .......................................... 709/217; 707/201
(58) Field of Search ..................................... 707/200, 201, 707/203, 204; 709/205, 217, 218, 219, 230

(56) References Cited

U.S. PATENT DOCUMENTS

| | | |
|---|---|---|
| 4,432,057 | 2/1984 | Daniell et al. . |
| 4,468,728 | 8/1984 | Wang . |
| 4,558,413 | 12/1985 | Schmidt et al. . |
| 4,611,272 | 9/1986 | Lomet . |
| 4,658,093 | 4/1987 | Hellman . |
| 4,714,992 | 12/1987 | Gladney et al. . |
| 4,714,996 | 12/1987 | Gladney et al. . |
| 4,866,611 | 9/1989 | Cree et al. . |
| 4,875,159 | 10/1989 | Cary et al. . |
| 4,897,781 | 1/1990 | Chang et al. . |
| 4,974,149 * | 11/1990 | Valenti .................................. 709/217 |
| 5,113,519 | 5/1992 | Johnson et al. . |
| 5,115,504 | 5/1992 | Belove et al. . |
| 5,155,847 | 10/1992 | Kirouac et al. . |
| 5,341,477 * | 8/1994 | Pitkin et al. .......................... 709/203 |
| 5,377,329 | 12/1994 | Seitz . |
| 5,388,255 | 2/1995 | Pytlik et al. . |
| 5,473,772 | 12/1995 | Halliwell et al. . |
| 5,574,906 * | 11/1996 | Morris ...................................... 707/1 |
| 5,581,764 | 12/1996 | Fitzgerald et al. . |
| 5,586,322 | 12/1996 | Beck et al. . |
| 5,734,909 * | 3/1998 | Bennett ................................. 710/200 |
| 5,832,520 * | 11/1998 | Miller ................................... 707/203 |
| 5,835,911 * | 11/1998 | Nakagawa et al. ................... 707/203 |
| 5,892,911 * | 4/1999 | Ishibashi et al. ..................... 709/217 |

OTHER PUBLICATIONS

Symborski, "Updating Software and Configuration Data in a Distributed Communication Network".*

(List continued on next page.)

*Primary Examiner*—Dung C. Dinh
(74) *Attorney, Agent, or Firm*—Charles E. Gotlieb

(57) ABSTRACT

A system and method for distributing software applications and data to many thousands of clients over a network. The applications are called "channels", the server is called the "transmitter", and the client is called the "tuner". The use of channels is based on subscription. The end-user needs to subscribe to channel before it can be executed. When the end-user subscribes to a channel the associated code and data is downloaded to the local hard-disk, and once downloaded the channel can be executed many times without requiring further network access. Channels can be updated automatically at regular intervals by the tuner, and as a result the end-user is no longer required to manually install software updates, instead these software and data updates are automatically downloaded and installed in the background. This method of automatic downloading of updates achieves for the client the same result as the broadcast distribution of software over a connection based network, but wherein the client initiates each update request without requiring any special broadcast networking infra structure.

20 Claims, 13 Drawing Sheets

OTHER PUBLICATIONS

Dart, Susan A., "The Past, Present and Future of Configuration Management," Technical Report, Software Engineering Institute, Jul. 1992, pp. 1–28, Carnegie Mellon University, Pittsburgh, PA USA.

Dart, Susan, "Concepts in Configuration Management Systems," Article, Software Engineering Institute, Jun. 12–14, 1991, Carnegie Mellon University, Pittsburgh PA, USA.

Hiller, Thomas, "SUP–das Software Update Protocol der Carnegie–Mellon Universitat," Feb. 2, 1997 World Wide Web Page. German Language Document: A concise explanation is attached.

Kumar, Puneet, "Coping with Conflicts in an Optimistically Replicated File System," Article, Nov. 8–9, 1990, pp. 60–64, School of Computer Science, Carnegie Mellon University, Pittsburgh, PA, USA.

Downing, Alan R., Et. AL., "OSCAR: A System for Weak—Consistency Replication," Article, Nov. 8–9, 1990, pp. 26–30, Information and Telecommunications Sciences Center, SRI International, Menlo Park, CA, USA.

Faloutsos, Christos, "Multiattribute Hashing Using Gray Codes," Article, Department of Computer Science, 1986, pp. 227–238, University of Maryland, College Park, MD, USA.

Feiler, Peter, and Downey, Grace, "Transaction–Oriented Configuration Management:: A Case Study," Technical Report, Software Engineering Institute, Nov. 1990, pp. 9–23, Carnegie Mellon University, Pittsburgh, PA USA.

Feiler, Peter, and Downey, Grace, "Tool Version Management Technology: A Case Study," Technical Report, Software Engineering Institute, Nov. 1990, pp. 1–30 Carnegie Mellon University, Pittsburgh, PA USA.

Feiler, Peter, "Software Configuration Management: Advances in Software Development Environments," Article, Software Engineering Institute, Mar. 9, 1990, pp. 1–12, Carnegie Mellon University, Pittsburgh, PA, USA.

Cooper, Michael A., "Overhauling Rdist for the '90's," Article, Proceedings of the Sixth Systems Administration Conference (LISA VI), USENIX Association, Oct., 1992, pp. 175–188, Long Beach, CA, USA.

Brown, A., et al, "The State of Automated Configuration Management," Annual Technical Review, Sep. 1991, pp. 1–52, Software Engineering Institute, Carnegie Mellon University, Pittsburgh, PA, USA.

Brown, Mark R. and Ellis, John R., "Bridges: Tools to Extend the Vesta Configuration Management System," Article, System Research Center, Digital Equipment Corporation, Jun. 14, 1993, pp. 1–42, Palo Alto, CA, USA.

Bauer, Michael A., "Naming and Name Management Systems: A Survey of the State of the Art," Technical Report 241, Jun. 1989, pp. 1–83, Distributed Directories Laboratory, Department of Computer Science, The University of Western Ontario, Ontario, Canada.

Bauer, Michael A., et al, "Replication Strategies for X.500: Experiments with a Prototype X.500 Directory," Technical Report 279, Oct. 1990, pp. 1–36, Distributed Directories Laboratory, Department of Computer Science, The University of Western Ontario, Ontario, Canada.

Bennett, J.M. and Bauer, Michael A., "An Analysis of Replication Strategies for X.500–like Distributed Directories," Proceedings, Workshop On the Management of Replicated Data, Nov. 8–9, 1990, pp 137–42 IEEE Comput. Soc. Press Los Alamitos, CA.

Broder, Andrei Z., "Some applications of Rabin's fingerprinting method," Article, presented at workshop—Sequences II Methods in Communication, Security, and Computer Science, Jun. 17–21, 1991, pp. 143–152, Springer–Verlag, New York, USA, Published 1993.

Broder, Andrei Z., et al, "Trading Space for Time in Undirected s–t Connectivity," Article, May 7, 1991. pp. 1–14, Digital Equipment Corporation, Systems Research Center, Palo Alto, CA, USA.

Barbara, Daniel and Lipton, Richard J., "A Class of Randomized Strategies for Low–Cost Comparison of File Copies," Article, Apr. 1991, pp. 160–179, vol. 2, No. 2, IEEE Transactions On Parallel And Distributed Systems, Princeton, NJ, USA.

IBM, "Administrator's Guide" IBM Distributed Change Management Facility /MVS, Version 1, Release 1, $1^{st}$ edition, Aug. 1990, pp. 1–64, Cary, NC, USA.

Metzner, John A., "A Parity Structure for Large Remotely Located Replicated Data Files", Article, IEEE Transactions on Computers vol. C 32, No. 8, Aug. 1983, pp. 727–730, IEEE Computer Society Press, Washington, D.C., USA.

Schwarz, Thomas, et al, "Low Cost Comparisons of File Copies," Technical Report, UCSD, Proc. Of the $10^{th}$ international Conference on Distributed Computing Systems, May/Jun., 1990, pp. 196–202, IEEE Computer Society Press, Washington, D.C., USA.

Sarin, Sunil, Floyd, Richard, and Phadnis, Nilkanth, "A Flexible Algorithm for Replicated Directory Management," Article, Proc. Of the $9^{th}$ International Conference on Distributed Computing Systems, 1989, pp. 456–464, IEEE, Cambridge, MA, USA.

Rangajaran, Sampath and Fussell, Donald, "Rectifying Corrupted Files in Distributed File Systems", Article, $11^{th}$ International Conference on Distributed Computing Systems, May, 1991, pp. 446–453, University of Maryland, College Park, MD, USA.

Madej, Tom, "An Application of Group Testing to the File Comparison Problem," Article, Proc. Of the $9^{th}$ International Conference on Distributed Computing Systems, Jun., 1989, pp. 237–243, University of Illinois, Urbana, IL, USA.

Barbara, Daniel, et al, "Exploiting Symmetries for Low–Cost Comparison of File Copies," Article, $8^{th}$ International Conference on Distributed Computing Systems, Jun. 1988, pp. 471–479, IEEE Computer Society Press, Princeton University, Princeton, NJ, USA.

Fuchs, W.K., WU, K. and Abraham, J., "Low–Cost Comparison and Diagnosis of Large Remotely Located Files," Article, Proc. $5^{th}$ Symposium on Reliability in Dist. Software and Database Systems, Jan., 1986, pp. 67–73, IEEE, Computer Society Press, IL, USA.

Pu, Calton, Noe, Jerre, and Proudfoot, Andrew, "Regeneration of Replicated Objects: A Technique and it's Eden Implementation," IEEE Transactions on Software Engineering, vol. 4, No. 7, Jul. 1988, pp. 936–945, University of Wash., Seattle, WA, USA.

Acharya, Arup, and Badrinath, B.R., "Delivering Multicast Messages in Networks with Mobile Hosts," Article, Proc. $13^{th}$ International Conference on Distributed Computing Systems, May. 1993, pp. 292–299, IEEE Computer Society Press, Los Alamitos, CA, USA.

Jia, Xiaohua, et al, "Highly Concurrent Directory Management in the Galaxy Distributed System," Article, Proc. 10$^{th}$ International Conference on Distributed Computing Systems, May–Jun., 1990, pp. 416–423, IEEE Computer Society Press, Los Alamitos, CA, USA.

Tugender, Ronald, "Maintaining Order and Consistency in Multi–Access Data," Article, AFIPS Conference Proceedings, 1979 National Computer Conference, Jun. 1979, pp. 869–874, USC Information Science Institute, Marina Del Ray, CA, USA.

Gopal, Inder and Segall, Adrian, "Directories for Networks with Casually Connected Users," 1990, pp. 255–262, Elsevier Science Publishers B.V. (North–Holland.).

Cheng, Hsiao–Chung and Sheu, Jang–Ping, "Design and Implementation of a Distributed File System," Article, Software—Practice and Experience, vol. 21(7), Jul., 1991, pp. 657–675, John Wiley and Sons, Ltd.

Grosse, Eric, "Repository Mirroring," Article, ACM Transactions on Mathematical Software, vol. 21, No. 1, Mar. 1995, pp. 89–97, Murray Hill, NJ, USA.

Howard, John H., "Using Reconciliation to Share Files between Occasionally Connected Computers," Article, Proc. 4$^{th}$ Workshop on Workstation Operating Systems, Oct., 1993, pp. 56–60, IEEE Computer Society Press, Cambridge, MA, USA.

Courington, William, "The Network Software Environment," Tech. Sun Microsystems Tech Report, 1989, pp. 1–104, Sun Microsystems Mt. View, CA, USA.

Nachbar, Daniel, "When Network File Systems Aren't Enough: Automatic Software Distribution Revisited," Article, USENIX Association, Summer Conference Proceedings, Jun., 1986, pp. 159–171, Bell Communications Research, Morristown, NJ, USA.

Satdeva, Bjorn and Moriarty, Paul M., "Fdist: A Domain Based File Distribution System for a Heterogeneous Environment," USENIX Association, Proc. Of the 5$^{th}$ Large Installation Systems Administration Conference,(LISA V) Sep./Oct. 1991, pp. 109–125.

Symborski, Carl, "Updating Software and Configuration Data in a Distributed Communications Network," Article, Hughes Network Systems, IEEE, 1988, pp. 331–338, Germantown, MD, USA.

Shafer, Stephen and Thompson, Mary, "The SUP Software Upgrade Protocol," Sep. 1989, pp. 1–13, Carnegie Mellon University School of Computer Science, Pittsburgh, PA, USA.

Prusker, Francis J. and Wobber, Edward P., "The Siphon: Managing Distant Replicated Repositories," Article, Digital Equipment Corporation, Nov. 8–9, 1990, pp. 44–47, IEEE, Palo Alto, CA, USA.

Cooper, Michael A., "Rdist Version 6.1, May 2, 1994," 1994, pp. 1–4, University of Southern California Computing Services, Los Angeles, CA, USA.

Paciorek, Noemi and Teller, Mark, "An Object Oriented, File System Independent, Distributed File Server," Article, File Systems Workshop, USENIX Association, May 21, 1992, pp. 45–62, Marlborough, MA, USA.

Shasa, Dennis and Zhang, Kaizhong, "Fast Algorithms for the Unit Cost Editing Distance Between Trees," Article, Journal of Algorithms II, 1990, 581–62, Academic Press, Inc, New York, NY, USA.

Tai, Kuo–Chung, "The Tree to Tree Correction Problem," Article, Journal of the Association for Computing Machinery, vol. 26, No. 3, Jul. 1979, pp. 422–433, Raleigh, NC, USA.

Digital Equipment Corporation, "fingerprint/src/fingerprint.i3," SRC Modula–3, 1994, Digital Equipment Corporation, pp. 1–5, Maynard, MA, USA.

Loverso, Susan, et al, "The OSF/1 Unix Filesystem (UFS)," Article, USENIX, Winter, 1991, pp. 207–218, Dallas, Texas, USA.

Lu, Shin–Yee, "A Tree to Tree Distance and It's Application to Cluster Analysis," IEEE Transactions on Pattern Analysis and Machine Intelligence, vol. PAMI–1, No. 2, Apr., 1979, pp. 219–224, Syracuse University, Syracuse, NY, USA.

Katz, Randy H., et al, "Version Modeling Concepts for Computer–Aided Design Databases," Article, Association for Computing Machinery, 1986, pp. 379–386, Berkeley, CA, USA.

Kistler, James Jay, "Increasing File System Availability through Second Class Replication," IEEE, Nov. 8–9, 1990, pp. 69, Carnegie Mellon University, Pittsburgh, PA, USA.

Kistler, James J. and Satyanarayanan, M., "Disconnected Operation in the Coda File System," Article, ACM Transactions on Computer Systems, vol. 10, No. 1, Feb. 1992, pp. 3–25, ACM, Carnegie Mellon University, Pittsburgh, PA, USA.

Harrison, Helen E., "So Many Workstations, So Little Time," USENIX Association, Proc. Of the 6$^{th}$ Systems Administration Conference (LISA VI), Oct., 1992, pp. 79–87, SAS Institute, Cary, NC, USA.

Pukatzki, Dieter and Schumann, Johann, "Autoload; The Network Management System," USENIX Association, Proc. Of the 6$^{th}$ Systems Administration Conference (LISA VI), Oct., 1992, pp. 97–104, Germany.

Rosenstein, Mark and Peisach, Ezra, "Mkserv—Workstation Customization and Privatization," USENIX Association, Article, Proc. Of the 6$^{th}$ Systems Administration Conference (LISA VI), Oct., 1992, pp. 89–95, MIT Information Systems, Boston, MA, USA.

Vangala, Ram R., et al, "Software Distribution and Management in a Networked Environment," Article, USENIX Association, Proc. Of the 6$^{th}$ Systems Administration Conference (LISA VI), Oct., 1992, pp. 163–170, NJ, USA.

Zwicky, Elizabeth D., "Typecast: Beyond Cloned Hosts," Article, USENIX Association, Proc. Of the 6$^{th}$ Systems Administration Conference (LISA VI), Oct., 1992, pp. 73–78, SRI International, Menlo Park, CA, USA.

Fletcher, Mark, "doit: A Network Software Management Tool," Article, USENIX Association, Proc. Of the 6$^{th}$ Systems Administration Conference (LISA VI), Oct., 1992, pp. 189–196, Cary, NC, USA.

Tichy, Walter F., "An Introduction to the Revision Control System," UNIX Programmer's Supplementary Documents vol. 1:13–1, Apr., 1986, pp. 13–1–13–21, Purdue University, West Lafayette, IN, USA.

Eirich, Thomas, "Beam: A Tool for Flexible Software Update," Article, 1994 LISA, Sep., 1994, p. 75–82, University of Erlangen–Numberg, Germany.

Rouillard, John P. and Martin, Richard B., "Depot–Lite: A Mechanism for Managing Software," Article, 1994 LISA, Sep., 1994, pp. 83–91, Boston, Massachusetts, USA.

Allman, Eric., "An Introduction to the Source Code Control System," UNIX Programmer's Supplementary Documents vol. 1:14–1, Apr., 1986, pp. 14–1–14–15, Berkeley, CA, USA.

Walpole, J. et al, "Maintaining Consistency in Distributed Software Engineering Environments," Article, IEEE, Proc. Of the 8$^{th}$ International Conference on Distributed Computing Systems, Jun., 1988, (no page #'s), Bailrigg, United Kingdom.

Osel, Peter, W. and Gansheimer, Wilfried, "OpenDist—Incremental Software Distribution," Article, USENIX Association, Proc. Of the 9$^h$ Systems Administration Conference (LISA IX), Sep., 1995, pp. 181–193, Siemens AG, Munchen, Germany.

Chiu, Sheng–Yang and Levin, Roy, "The Vesta Repository: A File System Extension for Software Development," Article, Systems Research Center of Digital Equipment Corporation, Jun., 1993, pp. 1–32, Palo Alto, CA, USA.

Manheimer, Kenneth, et al, "The Depot: A Framework for Sharing Software Installation Across Organizational and UNIX Platform Boundaries," Article, LISA IV, Oct., 1990, pp. 37–45.

Jones, George M. and Romig, Steven M., "Cloning Customized Hosts (or Customizing Cloned Hosts)," Article, LISA V, Sep./Oct., 1991, pp. 233–241, Ohio State University, Columbus, OH, USA.

Rich, Kenneth and Leadley, Scott, "hobgoblin: A File and Directory Auditor," Article, LISA V, Sep./Oct., 1991, pp. 199–206, University of Rochester, Rochester, NY, USA.

Wuu, Gene T.J. and Bernstein, Arthur, J., "Efficient Solutions to the Replicated Log and Dictionary Problems," Proc. Of the 3$^{rd}$ PODC Conference Proceedings, ACM, 1984, pp. 57–66, ACM Press, Department of Computer Science, SUNY Stony Brook, Long Island, NY, USA.

Daniels, Dean and Spector, Alfred Z., "An Algorithm for Replicated Directories," Proc. Of the 2$^{nd}$ PODC Conference Proceedings, 1983, pp. 24–43, ACM Press, Department of Computer Science, Carnegie Mellon University, Pittsburgh, PA, USA.

Gladney, H.M., "Data Replicas in Distributed Information Services," Article, ACM Transactions on Database Systems, vol. 14, No. 1, Mar. 1989, pp. 75–97, San Jose, CA, USA.

Colton, Malcom, "Replicated Data in a Distributed Environment," Proc. Of the 1993 ACM SIGMOD International Conference on Management of Data, vol. 22, Issue 2, May, 1993, pp. 464–466, ACM Press, Washington, D.C., USA.

Alonso, Rafael and Korth, Henry F., "Database System Issues in Nomadic Computing," Proc. Of the 1993 ACM SIGMOD International Conference on Management of Data, vol. 22, Issue 2, May, 1993, pp. 388–392, Princeton, NJ, USA.

Lindsay, et al, "A Snapshot Differential Refresh Algorithm," Proc. Of the 1986 ACM SIGMOD International Conference on Management of Data, ACM, 1986, pp. 53–60, ACM Press, San Jose, CA, USA.

Wolfson, Ouri and Jajodia, Sushil, "Distributed Algorithms for Dynamic Replication of Data," Proc. Of the 11$^{th}$ ACM SIGACT SIGMOD SIGART Symposium on Principles of Database Systems, ACM, Jul., 1992, pp. 149–156, ACM Press, San Diego, CA, USA.

Liskov, Barbara, et al, "Replication in the Harp File System," Proc. Of the 13$^{th}$ ACM Symposium on Operating Systems Principles, ACM, Oct., 1991, pp. 226–238, MIT, Cambridge, MA, USA.

Liskov Barbara, et al, "A Replicated UNIX File System," ACM Operating Systems Review, vol. 25, No. 1, Jan., 1991, pp. 60–64, ACM Press, MIT, Cambridge, MA, USA.

Ladin, Rivka, et al, "Lazy Replication: Exploiting the Semantics of Distributed Services," ACM Operating Systems Review, vol. 25, No. 1, Jan., 1991, pp. 49–55, ACM Press, Cambridge, MA, USA.

Tivoli Systems, Inc., "Tivoli/Courier User's Guide," User's Guide, Tivoli Systems, Inc., 1991–5, pp. 1–1–8–27, Austin, TX, USA.

Tivoli Systems, Inc., "Tivoli/Courier Reference Manual," Reference Manual, Tivoli Systems, Inc., 1991–5, pp. 1–1–6–4, Austin, TX, USA.

Lan Supervision, Inc., "Change Management Facility (CMF)," Administrator's Guide, 1995, pp. 2–159, San Ramon, CA, USA.

Lan Supervision, Inc., "Change Management Facility," General Information Guide, 1995, pp. 1–51, San Ramon, CA, USA.

IBM, "General Information Manual," IBM Distributed Change Management Facility/MVS, Version 1, Release 1, 1$^{st}$ edition, Aug. 1990, pp. 1–50, Cary, NC, USA.

Anderson, Paul, "Managing Program Binaries in a Heterogeneous UNIX Network," Article, LISA V Sep./Oct., 1991, pp. 1–7, University of Edinburgh, Edinburgh, U.K.

Cooper, Michael, RDist (Computer Program and Documentation), Web Site: http://hpux.dutchworks.nl, Date of Publication Unknown, not later than Feb. 25, 1997, HP Dutchworks, The Netherlands.

Lemay, Laura, "Official Guide to Castanet", 1997, iv–353 and supplements, 1$^{st}$ ed. Sams.net, Indianapolis, IN.

Baron, Robert J. and L.G. Shapiro, Data Structures and their Implementation, 1980, p 150 and pp. 218–219, Van Nostrand Reinhold Company, New York, New York, USA.

Bentley, Jon L., Multidimensional Binary Search Trees in Database Applications, IEEE Transactions on Software Engineering, Jul. 1979, pp. 333–340, vol. SE–5, Institute of Electrical and Electronics Engineers, Inc., New York, New York, USA.

Gotlieb, C.C. and L.R. Gotlieb, Data Types and Structures, 1978, pp. 169–185, Prentice Hall Inc., Englewood Cliffs, New Jersey, USA.

Gull, W.E. and M.A. Jenkins, Recursive Data Structures in APL, Communications of the ACM, Jan. 1979, pp. 79–96, vol. 22, No. 1, Association for Computing Machinery, Inc., Baltimore, Maryland, USA.

Lee, D.T. and C.K. Wong, Quintary Trees: A File Structure for Multidimensional Database Systems, Sep. 1980, pp. 339–353, vol. 5, No. 3, Association for Computing Machinery, Inc., Baltimore, Maryland, USA.

Tremblay, Jean–Paul and Paul G. Sorenson, An Introduction to Data Structures with Applications, 1984, pp. 811–826, Second Edition, McGraw–Hill Book Company, New York, New York, USA.

Brown, Bradley J., Checksum Methodology as a Configuration Management Tool, The Journal of Systems and Software, Jun. 1987, pp. 141–143, vol. 7, Elsevier Science Publishing Co., Inc., New York, New York, USA.

Segal, Mark E., and O. Frieder, Dynamically Updating Distributed Software: Supporting Change in Uncertain and Mistrustful Environments, Conference on Software Maintenance—1989, Oct. 16–19, 1989, pp. 254–261, IEEE Computer Society Press, Piscataway, New Jersey, USA.

Danzig, Peter B., R. S. Hall and M. F. Schwartz, A Case of Caching File Objects Inside Internetworks, Proceedings: SIGCOM '93—Ithaca N.Y., 1993, pp. 239–248, Association for Computing Machinery, Inc., Baltimore, Maryland, USA.

Wedde, Horst F. et al, Distributed Management of Replicated and Partitioned Files Under Dragon Slayer, Conference Publication: Compsac90, The Fourteenth Annual International Computer Software and Applications Conference, Oct. 1990, pp. 436–441, Institute of Electrical and Electronics Engineers, Inc., New York, New York, USA.

Pilarski, Slawomir, and T. Kameda, A Novel Checkpointing Scheme for Distributed Database Systems, Proceedings of the Ninth ACM SIGACT–SIGMOD–SIGART Symposium on Principles of Database Systems, Apr. 2–4, 1990, pp. 368–378, ACM Press, Baltimore, MD., USA.

Teorey, Toby J. and J.P. Fry, Design of Database Structures, 1982, pp. xiii–xv and 3–492, Prentice–Hall, Englewood Cliffs, New Jersey, USA.

Bentley, Jon Louis, and J.H. Friedman, Data Structures for Range Searching, Computing Surveys: The Survey and Tutorial Journal of the ACM, Dec. 1979, pp. 397–409, vol. 11, No. 4, Association for Computing Machinery, Inc., Baltimore, Maryland, USA.

Bentley, Jon Louis, Multidimensional Binary Search Trees Used for Associative Searching, Communications of the ACM, Sep. 1975, pp. 509–517, vol. 18, No. 9, Association for Computing Machinery, Inc., Baltimore, Maryland, USA.

Date, C.J., An Introduction to Database Systems, 1981, pp. 1–61, 97–115, 159–181, 237–273, 279–337, and 386–387, Third Edition, Addison–Wesley, Reading, Massachusetts, USA.

Korth, Henry F., and A. Silberschatz, Database System Concepts ($1^{st}$ ed.), 1986, pp. 265–272, McGraw–Hill Book Company, New York, New York, USA.

Nievergelt, J., Hinterberger, H., and K.C. Sevcik, The Grid File: An Adaptable, Symmetric Multikey File Structure, ACM Transactions on Database Systems, Mar. 1984, pp. 37–71, vol. 9, No. 1, Association for Computing Machinery, Inc., Baltimore, Maryland, USA.

Powers, Matthew D., Complaint for Infringement of U.S. Patent No. 5,919,247, Jul. 30, 1999, pp. 1–4. Menlo Park, California.

Powers, Matthew D., Marimba's Initial Disclosure of Asserted Claims Sep. 13, 1999, pp. 1–3, Menlo Park, California.

Barclay, Michael, Answer to Complaint; Counterclaim, Sep. 28, 1999, pp. 1–4, Certificate of Service by Mail, Facsimile Confirmation Report, Palo Alto, California.

Powers, Matthew D., Marimba's Reply to Novadigm's Counterclaim, Oct. 28. 1999, pp. 1–3, Menlo Park, California.

* cited by examiner

SYSTEM AND METHOD FOR THE DISTRIBUTION OF CODE AND DATA

CROSS REFERENCE TO RELATED APPLICATIONS

This application is a continuation of copending application Ser. No. 08/690,257 entitled, "System and Method for the Distribution of Code and Data" filed on Jul. 24, 1996 by Arthur van Hoff, Jonathan Payne and Sami Shaio now U.S. Pat. No. 5,919,247, having the same assignee as this application, and is incorporated herein by reference in its entirety.

BACKGROUND OF THE INVENTION

This invention relates to the distribution of software over a network. More particularly, this invention relates to the broadcasting of code and data, and updates thereto, to a plurality of subscribers.

In large scale networks such as the Internet, or Intranets within businesses, the distribution of software applications is often a manual and laborious process which requires the correct use of such program tools such as Rp, tar, compress, uudecode, and zip. The variety of platforms and tools, and the complexity of the installation procedures make this manner of distribution a complex and costly operation. Software installation is therefore frequently performed by specially trained system administrators rather than end-users.

The Internet has significantly accelerated the release schedule of applications significantly. Software is released more frequently and in smaller increments, and as a result many more installations have to be performed, resulting in more work for the system administrator. This multitude of releases can cause versioning problems when a new piece of installed software becomes incompatible with some previously installed software. As these updates occur more often, it is desirable to automate this update process.

A browser is a computer program for accessing the Internet via the World Wide Web, using the HTTP protocol. Browser plug-ins allow the user to extend the browser so that it can incorporate new functionality. Plug-ins are often very hard to install because they are platform dependent, and not secure because they are implemented in low level languages such as C or C++. To make plug-ins secure the browser needs to implement some form of authentication algorithm such as those based on the RSA algorithm.

The Java programming language and the introduction of Java applets has made it possible to run the same software program in a secure manner on many different platforms, thus enabling the wide distribution of such programs over a heterogeneous network such as the Internet. With Java applets it has also become possible to automatically launch small Java programs from a World Wide Web browser which eliminates a lot of the installation headache.

When Java applets are used as applications, the user is required to use a browser to navigate to the HTML page containing the desired applet. Once the applet is running it is usually constrained to the HTML page in which it is embedded, and the applet may be terminated prematurely when the user visits a new HTML page.

Further, Java applets have several restrictions which prevent them from scaling to larger applications. One problem is that the download times are too long because each Java class is loaded using a separate HTTP connection, and making each new connection often takes more time than the actual data transfer. Also, Java applets have to be reloaded from their source each time they are used, there is no mechanism for persistence other than HTTP caching. HTTP caching has the drawback that it is too low level, which causes versioning problems because it may mix old Java classes with newer Java classes. It is usually impossible to flush an applet from an HTTP cache, because it is not possible to know which files in the cache belong to the applet that needs to be flushed.

Because Java applets are reloaded for each use, and because they usually consist of many parts, they can significantly increase the number of server accesses and thus significantly increase the server load. As a result most high volume web-sites cannot afford to put Java applets on their HTML pages.

A Java applet generally cannot be used when the client computer is disconnected from the network. If the user wants to use an applet after disconnecting the network, it is first necessary to use all the features of the applet to populate the HTTP cache. However, if the user ventures into a previously unexplored part of the applet once disconnected, the applet will be unable to proceed and a fatal error will result. This is a major drawback of caching strategies because disconnected use is important for the next generation of portable Internet devices.

Another drawback of HTTP is that ongoing transactions can often be corrupted when new code and data is installed on the server. This is not a fatal problem when it happens to an HTML page, but corrupting a request can be catastrophic for an application. HTTP simply is not an appropriate mechanism for distributing code.

Some applications need the ability to monitor their use by the end-user. An example is advertisement tracking where it is necessary to keep an accurate count of how often an ad is shown. Currently advertisements are tracked by counting the number of hits on the HTML page containing the ad, which means that the page cannot be cached because this would affect the hit-rate. The page is therefore marked as not-cacheable, and the result is fewer cache hits and increased server load.

Personalized web-sites and personalized applications are also becoming very popular. Because of security constraints it is very hard to create a personalized applet. The reason is that the applet can't save state to the local disk and therefore all of the applet's persistent state must be stored in a database on the server, which further increases the server load.

What is needed is a way to distribute applications in a user-friendly, scaleable, secure, and seamless way, which enables the monitoring and personalization of applications, across a network such as the Internet.

SUMMARY OF THE INVENTION

In summary, the invention consists of a system and method for the large scale distribution of application code and data. The system consists of a client-side component, which the user uses to download applications, as well as a server-side component, which is used by a content provider or developer to make applications available for distribution.

The system also allows for the automatic updating, personalization, and usage monitoring of applications. In addition it is possible to use the application even when the host computer is not always connected to the network.

In describing this invention the following terminology from the broadcasting and publishing world is used:

Channel—A named application consisting of code and data which can be subscribed to by an end-user. Once delivered to the end-user a channel behaves much like a normal application.

Tuner—This is a client application which is used by the end-user to subscribe, download, execute, and administer channels. The tuner is responsible for the automatically updating of subscribed channels.

Transmitter—This is the server component of the system. It is responsible for delivering channels and channel updates to clients. The transmitter allows channels to be updated without interruption of service.

The end-user uses the tuner to subscribe to channels. When the user first subscribes to a channel a request is made to the transmitter hosting the channel. As a result of this request, the code and data for the channel is downloaded and stored in a local persistent storage, usually a hard disk. Once the entire channel is downloaded and installed on the local hard disk it can be executed as a normal application. The user can access the channel many times without requiring further network traffic.

At regular intervals the tuner can re-establish a connection to the transmitter from which the channel was obtained and check if the channel has changed. If changes are detected, these changes are downloaded and installed automatically.

DESCRIPTION OF THE PREFERRED EMBODIMENT

Figure 1A:
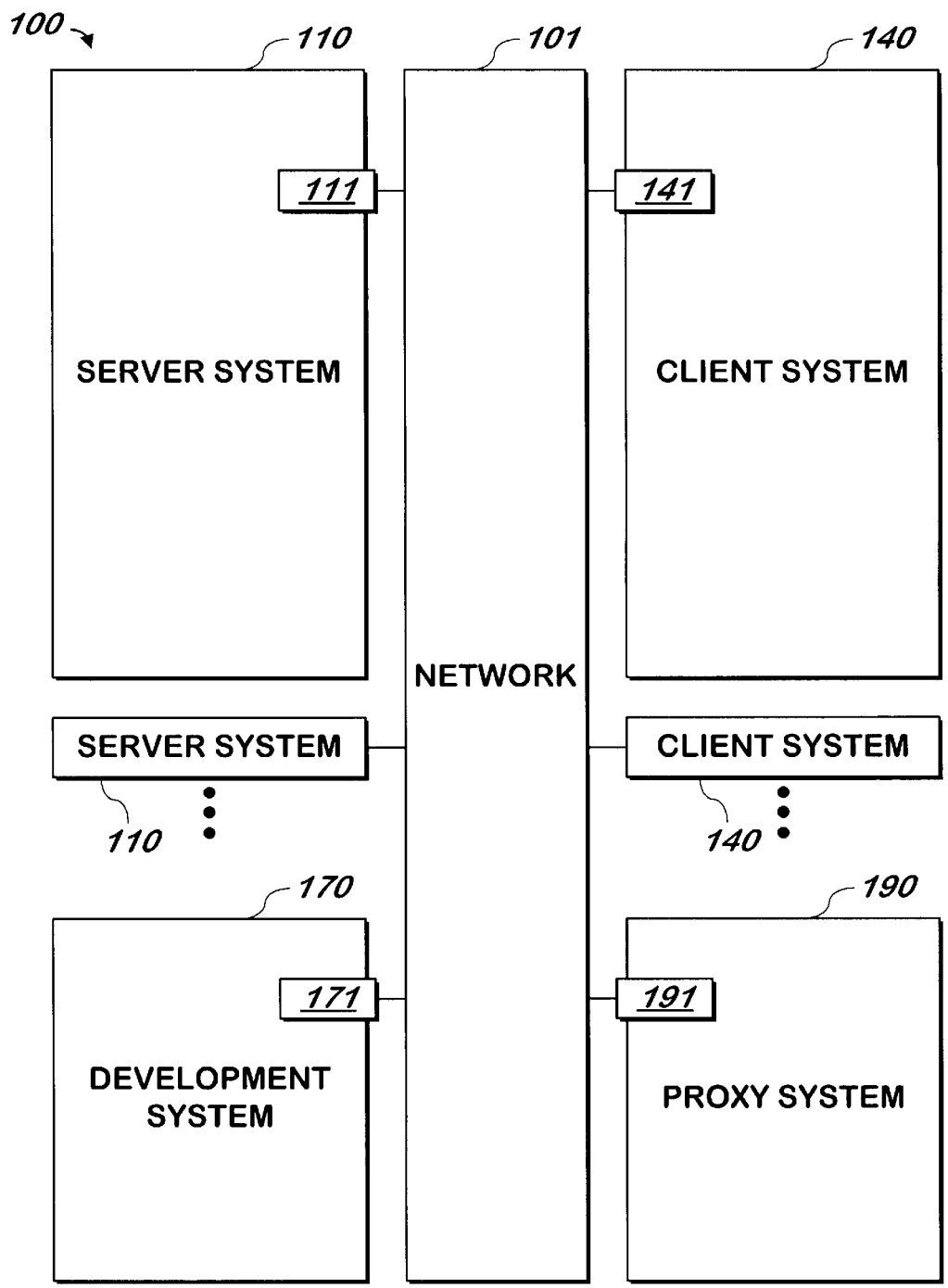
FIG. 1A–1E are block diagrams of a system for practicing the invention.

Referring to FIG. 1A, there is shown a distributed computer system 100 having a plurality of client computers 140, at least one server computer system 110, and at least one development system 170. Each client computer system 140 is connected to server system 110 by a network 101 such as the Internet, an Intra-net, or other type of network. Development system 170 is connected to server system 110 using the same network 101, although a separate network could be used, or 170 and 110 could be one system. The network connection between client system 140 and server system 110 is sometimes established via proxy system 190.

Figure 1B:
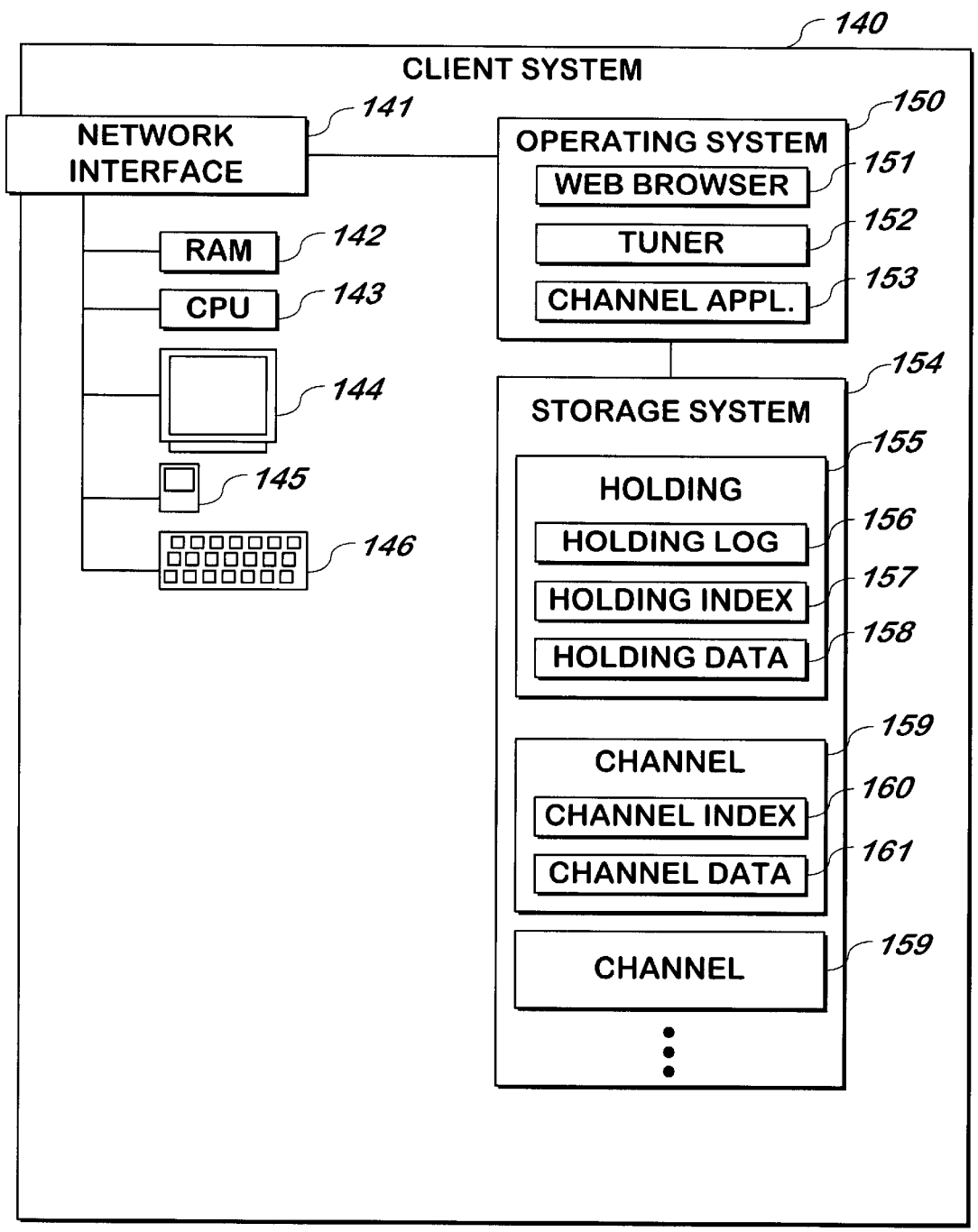

In the preferred embodiment shown in FIG. 1B, each client computer 140 includes a network interface 141 for communicating over the network with the server system 110, random access memory 142, a central processing unit 143, a display 144, a mouse-type input device 145, a keyboard input device 146, an operating system 150, and a storage system 154 such as a hard disk, or other kind of persistent storage.

Figure 1C:
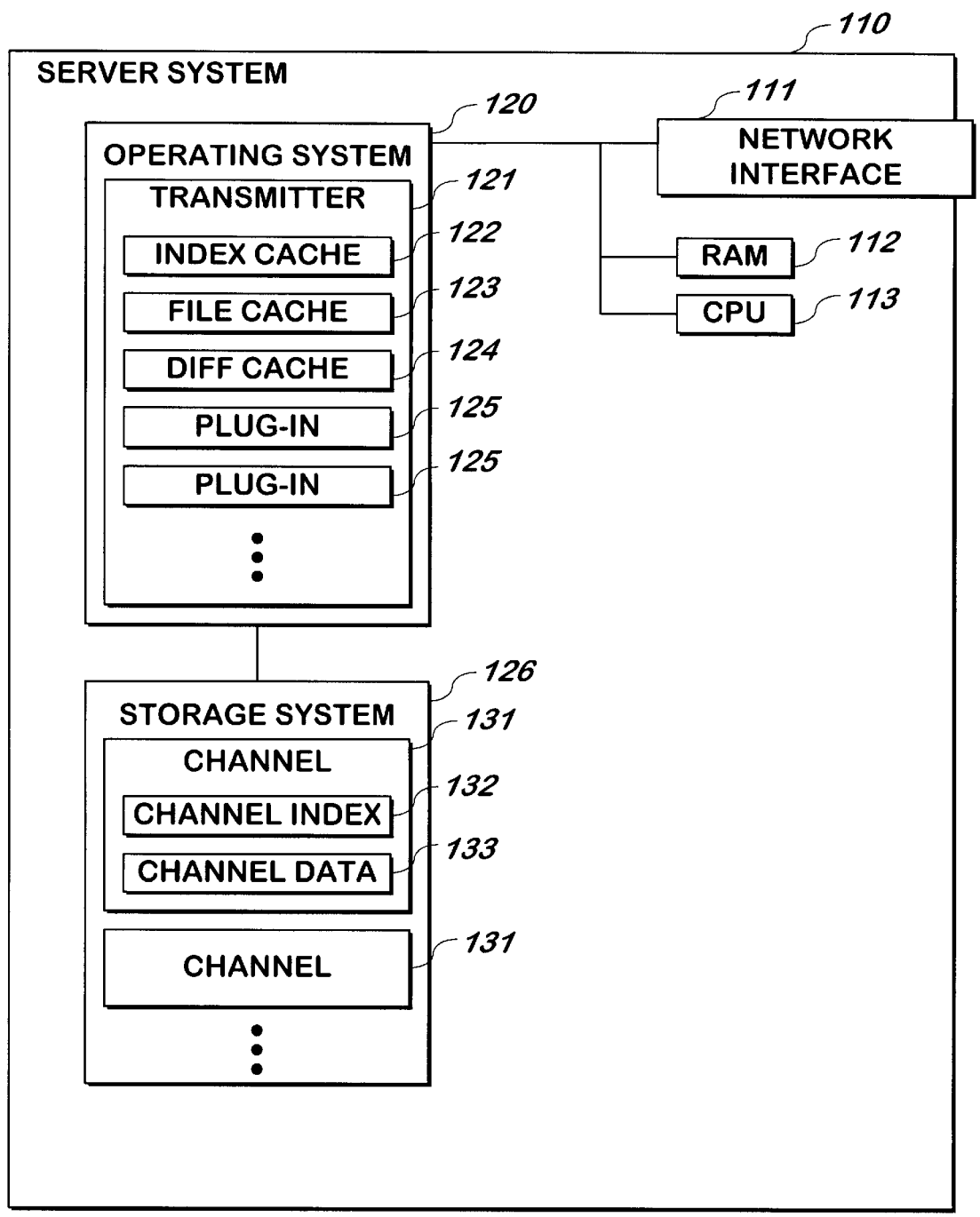

Referring now to FIG. 1C. each server system 110 includes a network interface 111, random access memory Each server system 110 includes a network interface 111, random access memory 112, a central processing unit 113, an operating system 120, and a storage system 126 such as a hard disk or other type of persistent storage.

Figure 1D:
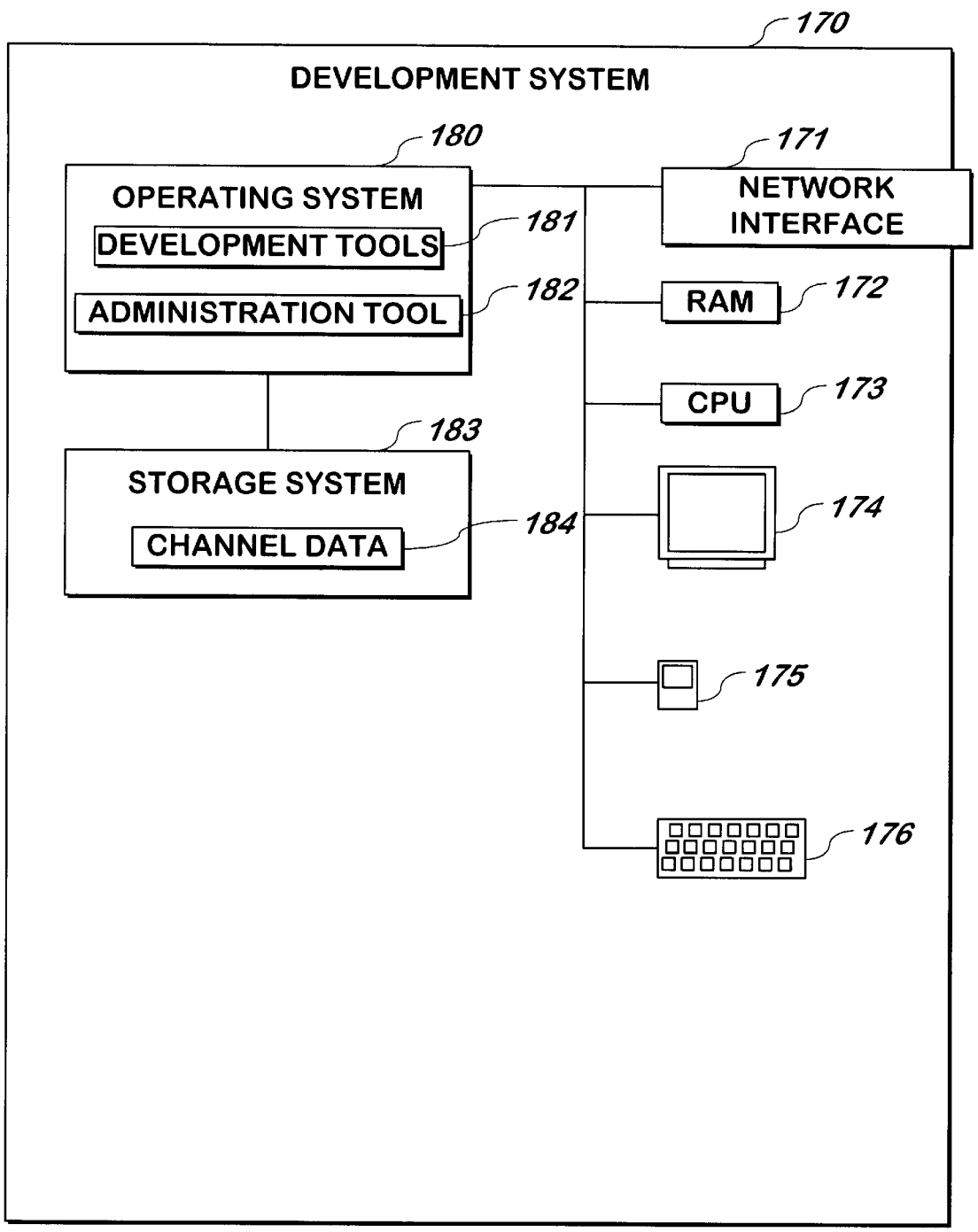

Referring now to FIG. 1D, each development system 170 includes a network interface 171, random access Each development system 170 includes a network interface 171, random access memory 172, central processing unit 173, a display 174, a mouse-type input device 175, a keyboard input device 176, an operating system 180, and a storage system 183 such as a hard disk or other type of persistent storage.

Figure 1E:
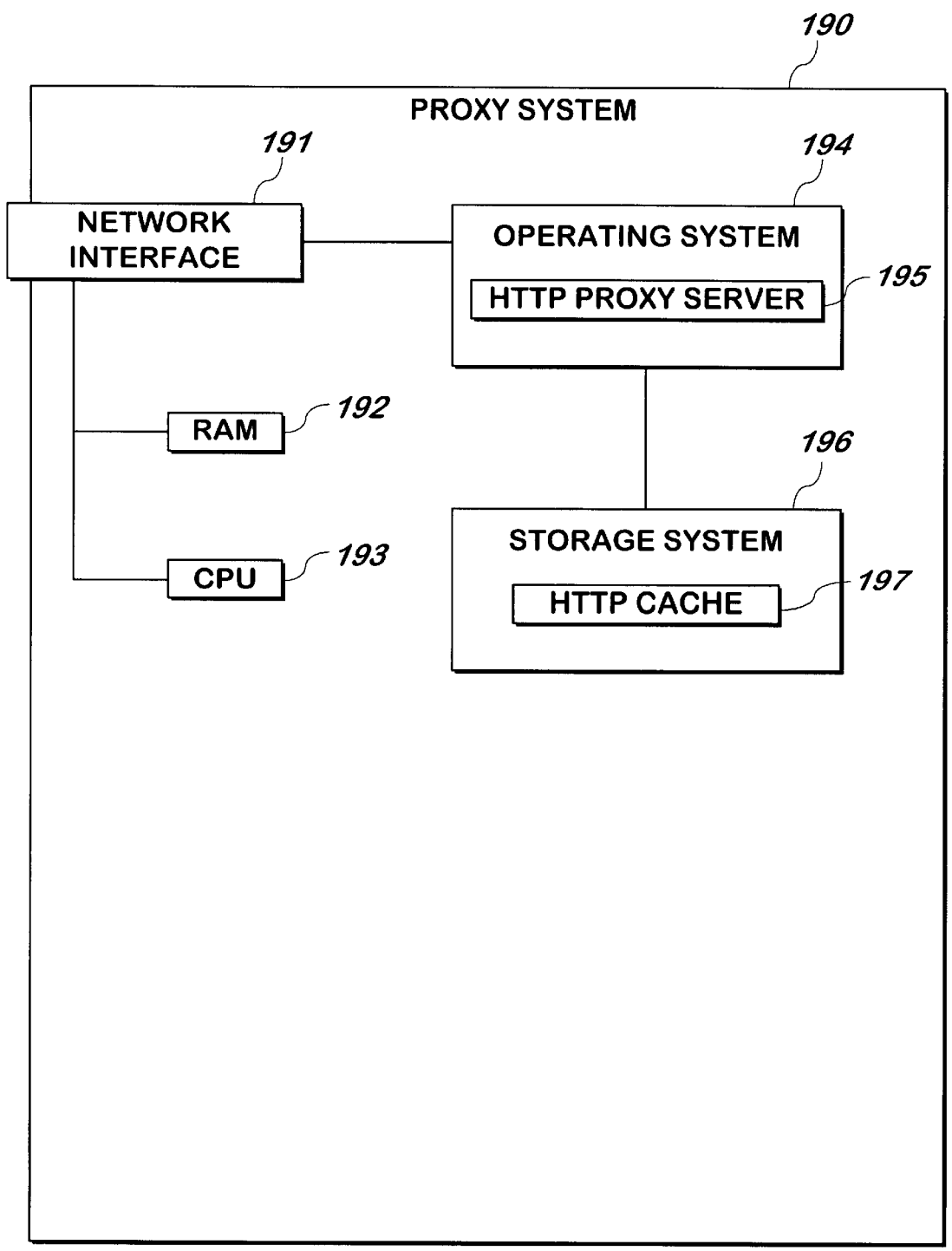

Referring now to FIG. 1E, each proxy system 190 includes a network interface 191, random access memory Each proxy system 190 includes a network interface 191, random access memory 192, a central processing unit 193, an operating system 194, and a storage system 196.

Referring now to FIG. 1A–1E. in the preferred embodiment, server system 110 distributes data and code to client In the preferred embodiment server system 110 distributes data and code to client systems 140 which make requests to server system 110 using network 101. Development system 170 is used to build, edit, and test the application code and data which is distributed by the server system 110.

Server system 110 uses its operating system 120 to run a transmitter process 121 for responding to requests from client systems 140. Transmitter process 121 distributes application code and data stored in storage system 126. This code and data is organized in channels, each of which comprises a particular software application. Storage system 126 contains at least one such channel 131. An exemplary channel, 131 is designated as channel N, but any number of channels can be stored in storage system 126. Channel N 131 comprises a channel index 132 and channel data 133. Transmitter process 121 can distribute many different channels to many client systems 140, each of which may subscribe to one or more of the channels provided by server system 110.

Moreover, system 100 may comprise many server and client systems each containing multiple channels, wherein the same client software can be used to subscribe to channels provided by different content providers. And each channel can be downloaded from a different server system.

Each client system 140 stores a plurality of channels 159 in storage system 154. An exemplary channel, 159 is designated as channel N, but any number of channels can be stored in storage system 154. A channel 159 comprises a channel index 160 and channel data 161. Channel data 133 on server system 110 and 161 on client system 140, comprise a set of data and code objects which are organized in a hierarchical manner in a persistent storage system such as a hierarchical file system or a relational database. In the preferred embodiment channel data is represented in a UNIX or DOS file system using directories, data files, and code files, however it is possible that the channel data is stored in other forms such as a relational database.

Client system 140 uses its operating system 150 to run a tuner process 152 to subscribe to one or more channels from a transmitter. Tuner process 152 can be invoked directly by the end user, or via a web browser 151. When the tuner process 152 is first invoked by the end user it may select an anonymous identifier which can be used to identify this instance of the tuner process in subsequent communications. In the preferred embodiment a 128 bit random number is used as the identifier.

To obtain the initial channel data, tuner process 152 uses network interface 141 to send a subscribe request to transmitter process 121 running on server system 110. Transmitter process 121 will respond with an update reply containing channel data 133 as will be described in more detail below. In response, tuner process 152 stores channel data 161 in storage system 154. Once the channel data is loaded tuner process 152 can start channel application 153. Channel application 153 is the active application corresponding to a channel 159 which is executed by operating system 150 from the code stored in channel data 161.

Channel 131 on server system 110 is identified by a hostname, a port number, and a channel name, which can be conveniently combined into a Universal Resource Locator, or URL. The end-user will initially subscribe to a channel by specifying the URL for the channel, or by selecting the channel URL in a web browser.

In the preferred embodiment, transmitter process 121 on server system 110 will produce a channel listing when the appropriate HTTP request is issued by tuner process 152 or web browser 151 on client system 140. That way the end-user can select a channel from the list of channels which are available from transmitter process 121 on server system 110.

Channel data 133 stored on server system 110 may be changed over time using the development system 170, each time creating a new version of channel data 133. After client system 140 has downloaded the initial channel data 161 it may issue an update request to server system 110 in order to obtain the most recent version of the channel data 133. Note that there may be many client systems 140, each of which may have obtained a different version of channel data 133 in a previous request. The system of the invention facilitates the efficient handling of many simultaneous update requests.

An update request may be requested by the end-user of client system 140, or it may be generated automatically by the tuner process 152 using a timer. The frequency and times of the updates can be specified by the channel provider as part of the channel data 133. The developer of the channel will usually choose the frequency of updates to match the expected frequency of updates of channel data 133 on server system 110.

When an update request is received by server system 110, transmitter process 121 computes the set of differences between channel data 161 on client system 140 and channel data 133 on server system 110, and determines a set of commands which will be transmitted to client system 140 which are then used to update channel data 161 on client system 140.

To facilitate the efficient comparison of channels, each channel contains a channel index which is stored along with the channel data. Server system 110 maintains channel index 132 for channel data 133 while client system 140 maintains channel index 160 for channel data 161. As described in detail below, channel indices are used to compute the differences between channels. A channel index describes the state of a channel and thus describes the version.

Because transmitter process 121 can host multiple channels it is possible to combine multiple requests for channels hosted by the same transmitter into one request. This bundling of requests is an optimization which does not affect the semantics of request handling in a significant manner and is entirely optional.

Client system 140 may be located inside a corporation which uses firewall technology to prevent unauthorized access to their systems through network 101. A commonly used solution is to make a request through an HTTP proxy server. Proxy system 190 runs such an HTTP proxy server process 195, which may have an associated persistent cache 197 for storing HTTP related data. The proxy system 190 is allowed to contact destinations outside the firewall domain, whereas the client system 140 is not.

When inside a firewall the tuner process 152 on client system 140 is not allowed to contact transmitter process 121 running on server system 110 directly. To submit a request to tuner process 152 it can prepend an HTTP request header to the request and submit it to the proxy process 195 on proxy system 190 via network 101. Proxy process 195 will forward the request to destination transmitter process 121 as specified in the HTTP request header. Transmitter process 121 will strip of the HTTP request header and prepend an HTTP reply header to the subsequent reply.

Figure 2:
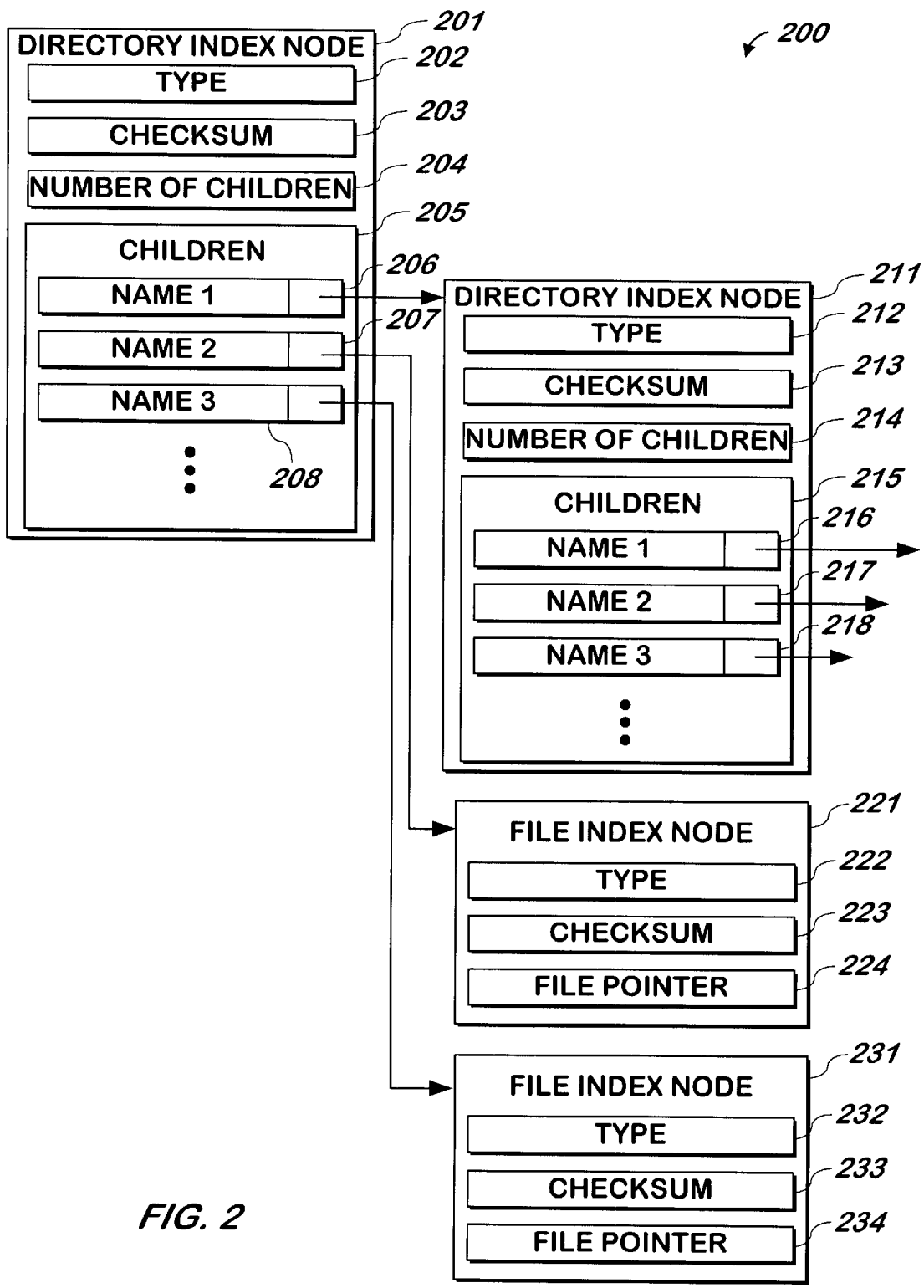
FIG. 2 is a depiction of the channel index data structure.

FIG. 2 is a depiction of the structure of a channel index 200. A channel index is a hierarchical tree data structure which can be stored in random access memory or in a persistent storage system. A channel index is a representation of the channel data and its structure. In the preferred embodiment each file and directory is represented as a node in the tree. FIG. 2 shows 4 example nodes 201, 211, 221, and 231 of a channel index, which can include many more nodes. In the preferred embodiment an object oriented data structure is used to represent this hierarchical tree data structure.

Channel index 200 contains directory nodes such as 201 and 211, and file nodes such as 221, and 231. Directory nodes can have file nodes and/or other directory nodes as "children". The file nodes are the leaf nodes of the tree. File node 221 contains a type field 222 indicating that it is a file node, a checksum 223, and a file pointer 224 which is a pointer to the storage location of the file's content. File node 231 has a structure identical to that of file node 221.

Checksum 223 of file node 221 is a binary number computed from the entire content of the file that this node represents. The checksum is the digital fingerprint of the node and it identifies the node and its content. In the preferred embodiment this checksum is a 128 bit MD5 checksum. The MD5 algorithm is an Internet standard as described by R. L. Rivest, "The MD5 Message Digest Algorithm", RFC 1321, April 1992.

Because the MD5 checksum 223 is computed using the entire content of the file, and because an MD5 checksum has a very high probability of being different for different files, it can be used to perform efficient equality checks between file nodes. If two checksums are different the files for which they are computed are guaranteed to be different; if the checksums are the same the files have a very high probability of being the same.

Directory node 201 contains a type field 202 indicating that this is a directory node, a checksum 203, a number of children 204, and a list of children 205. Each child 206, 207, and 208 has a name and points to the node that defines each child. In this embodiment, the list of children 205 is sorted alphabetically. Directory node 211 has a structure identical to directory node 201.

The directory node checksum 203 is computed using the following function: checksum(directory-node)= checksum(child-name$_1$) * checksum(child-node$_1$) * prime-number$_1$+ checksum(child-name$_2$) * checksum(child-node$_2$) * prime-number$_2$+

. . .

checksum(child-name$_n$) * checksum(child-node$_n$) * prime-number$_n$

The prime numbers used in this function are taken from an independent vector of large prime numbers. Thus the directory node checksum 203 is computed using the checksums of the children of the directory, the checksum of the names of the children, and the position of the node in the list of children. Any change in a directory node, repositioning a node, renaming a child node, or any change to a child node's checksum will almost always result in a different checksum value for the directory node. As a result the checksum can be used for efficient equality checks between directory nodes because if two directory node checksums are equal, then the two nodes and the content and position of their children are very likely to be identical.

While any of a variety of methods known in the art may be used to compute the checksums, when transferring an index data structure between two computer systems over a network it is important that both the sender and the receiver use the use the same method for computing file and directory node checksums. Similarly, both the sender and receiver must use the same sort order and vector of prime numbers.

Referring back to FIGS. 1A–1E, transmitter process 121 on server system 110 stores a channel index 132 as part of each channel 131. Channel index 132 is an index for channel data 131 and represents the state of channel 131. Client system 140 also maintains a channel index 160 for each channel 159. Tuner process 152 will include index 160 as part of an update request for channel 159 to transmitter process 121.

Transmitter process 121 will use client index 160 from the update request and compare it against channel index 132 from channel 131, and compute a set of differences. The resulting "update" reply will be a set of commands which are transmitted back as part of the reply to tuner process 152. Tuner process 152 will use these commands to modify channel 159 and bring it up to date with respect to channel 131 on server system 110.

Figure 3A:
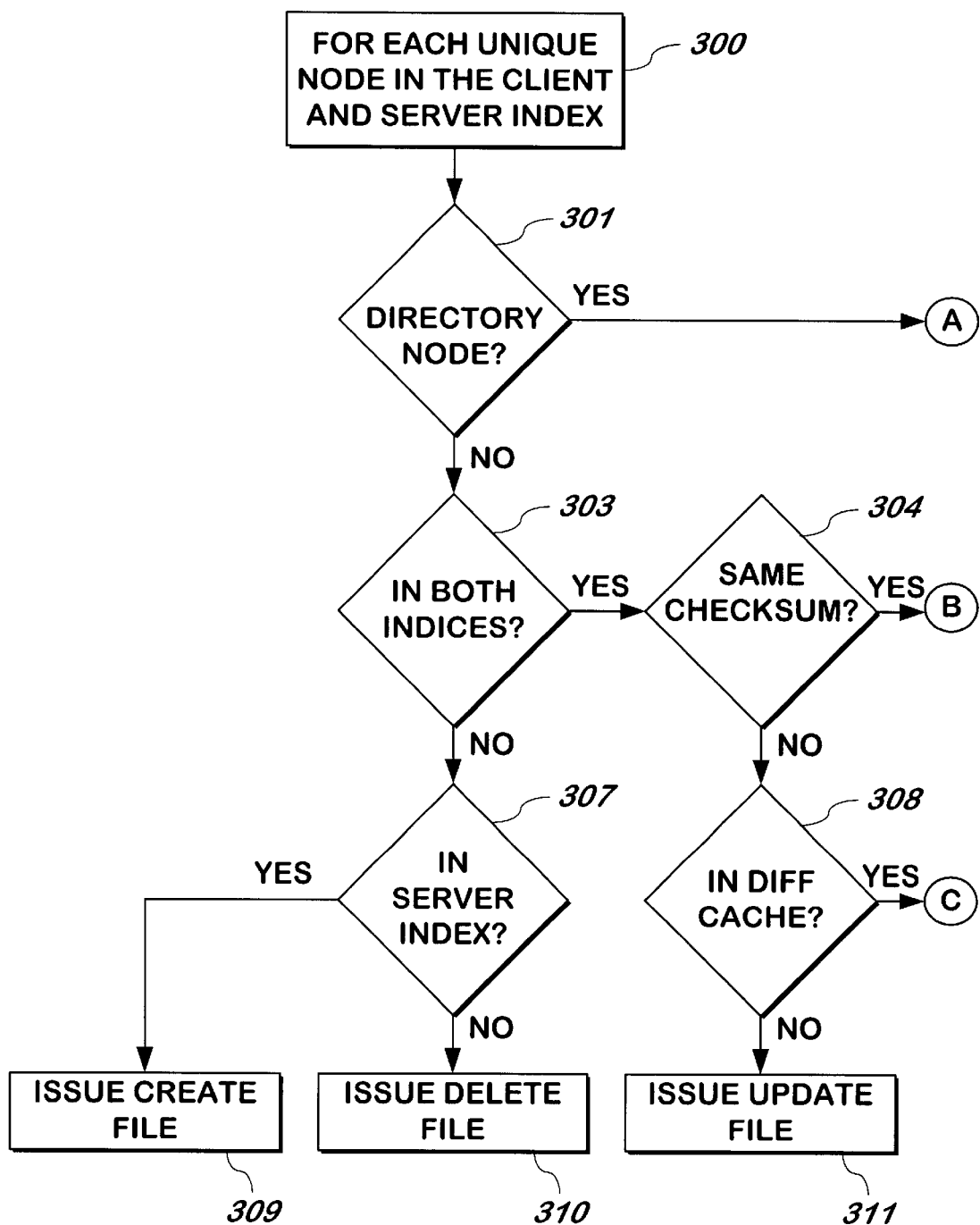
FIGS. 3A and 3B are a flow chart illustrating a method for comparing indices.
Figure 3B:
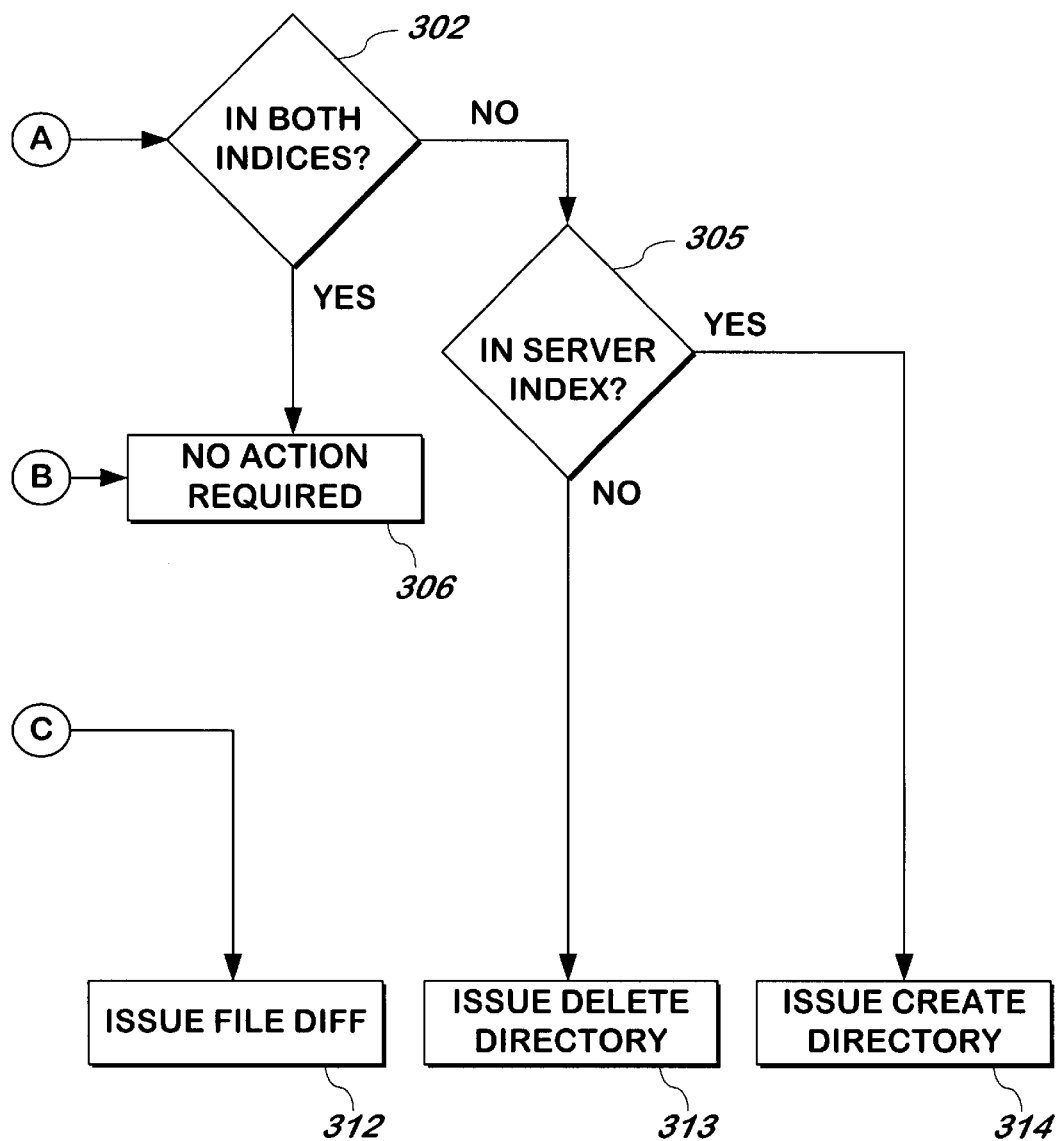

FIGS. 3A and 3B are a flow chart which illustrates the method used by transmitter process 121 to generate the correct set of reply commands for an update request. The method operates on a channel index from a client system, referred to as the client index, and an index from the server system, referred to as the server index.

Action 300 indicates that the method is executed for each unique node in both indices. Nodes are processed in breadth-first order, and nodes with the same path in both the client and server index are processed only once. The path of a node is the concatenation of the name of the node and the names of its parent nodes, similar to a UNIX or DOS file or directory path.

If step 301 determines that the node is a directory node, then step 302 checks if the node occurs in both the client and the server index. If it occurs in both indices no action is required, as indicated at step 306, and control returns to action 300 for processing the next unique node. If the node does not occur in both indices then step 305 determines if it occurs only in the server index. If the node occurs only in the server index then step 315 issues a directory create command; otherwise step 313 issues a directory delete command.

If step 301 determines that the node is not a directory node, then it must be a file node, and step 303 checks if it occurs in both indices. If it does not occur in both indices, the step 307 checks if it occurs only in the server index. If it occurs only in the server index step 309 will issue a create file command, otherwise step 310 issues a delete file command.

If step 303 determines that the file occurs in both indices, and step 304 determines that the two files have the same checksum, then no action is required, as indicated at step 306. However, if the checksums differ, then step 308 checks if a diff is available based on the two checksums. If a diff is available step 312 issues a file diff command, otherwise step 311 issues an update file command. A diff is a file containing the differences between two versions of a file. As explained in more detail below, a diff file may be created and stored during the processing of an install request for a file which is updated by transmitter process 121.

The commands which are generated as a result of the index comparison are sent to the client system as part of the update reply. The create file and update file command from steps 309 and 311 contain the entire contents of the new file, which may be a large amount of data. For updates, the protocol of the preferred embodiment avoids sending too much data by sending a file diff command instead, as indicated in step 312. The file diff command is a set of editing commands which take the content of the client file and transform it into the state of the server file. This is similar to the UNIX diff command, but an equivalent strategy may be used. Sending a set of diff commands instead of the entire file often involves sending much less data, and is therefore preferred.

Figure 4:
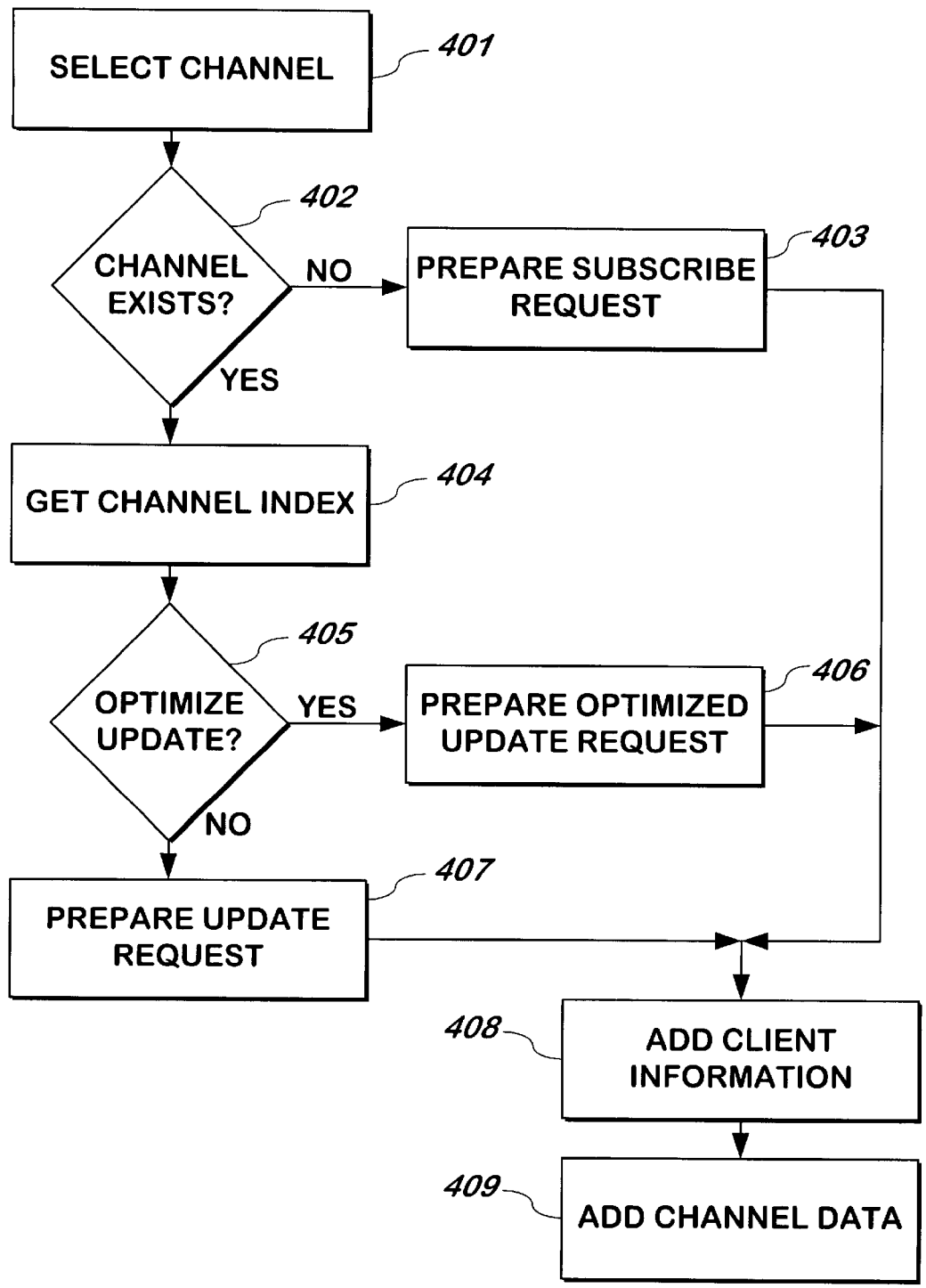
FIG. 4 is a flow chart illustrating a method for preparing a request.

FIG. 4 illustrates how a client prepares a request before sending it to the server. In step 401 a channel is selected for which the request will be issued, then step 402 checks if the channel already exists, if the channel does not exists step 403 will prepare a subscribe request.

If step 402 determines that the channel exists then step 404 will get the channel index of the channel in question and step 405 determines whether the request is a candidate for optimization. If the request can be optimized then step 406 will prepare an optimized update request, otherwise step 407 prepares a normal update request.

An update request as prepared by step 407 contains the index of the entire channel, which may be a large amount of data. An optimized update request as prepared by step 406 is identical to an update request except the channel index is replaced by the checksum of the channel index, and as a result the request will be a lot smaller.

The decision to optimize an update request in condition 405, is implementation-dependent and can be implemented in many different ways. It usually is a function which takes into account the size of the channel index, the update frequency of the channel, and the time since the last update.

After a request is prepared by steps 403, 406, or 407, then step 408 will add client information to the request. The client information consist of information about the platform, operating system, available memory, locale, time-zone, client-identifier, etc. In the preferred embodiment each client system is assigned a randomly chosen 128 bit client-identifier. This allows the content provider to identify which requests are issued by the same client.

After completing step 408, step 409 may add channel data to the request. Channel data is any kind of data that is generated by the channel application. This data is application specific and can contain user monitoring information, logging information, etc.

Figure 5A:
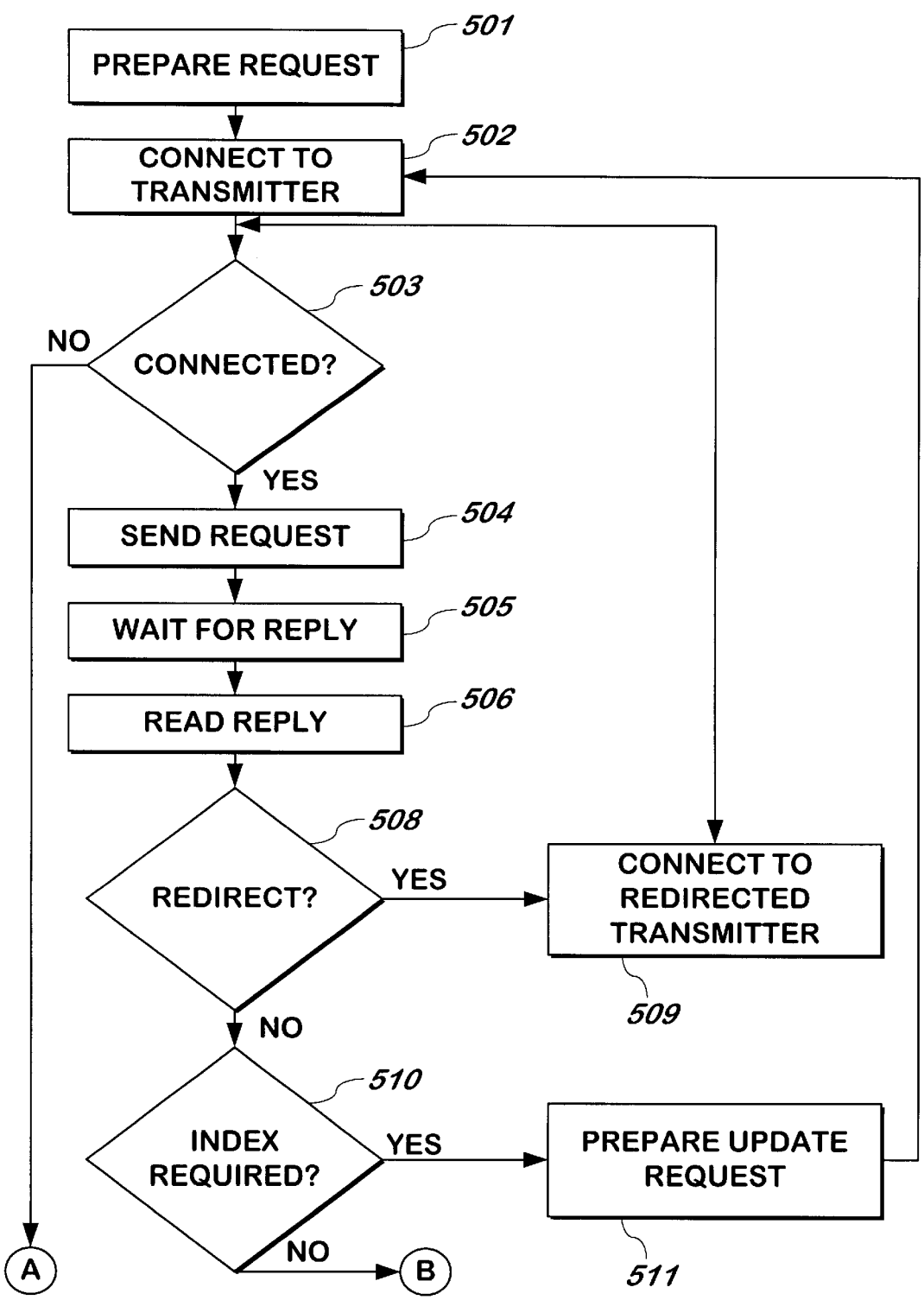
FIGS. 5A and 5B are a flow chart illustrating a method for processing a request by a client system.
Figure 5B:
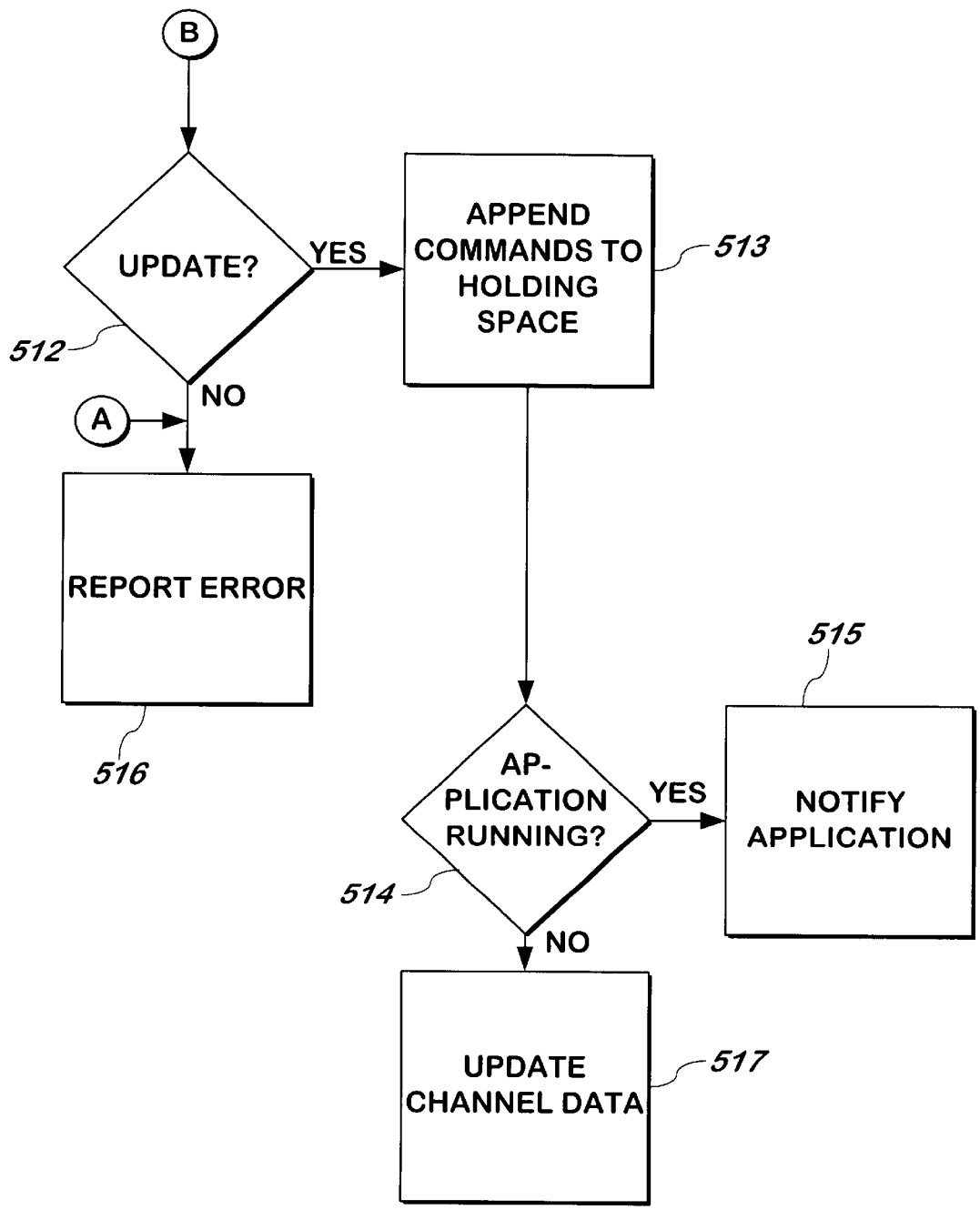

FIGS. 5A and 5B are a flow chart illustrating how a client issues a request to a server. Step 501 prepares a request as previously described with reference to FIG. 4. Step 502 establishes a network connection to the transmitter process running on the server system. To establish the network connection a server host name, a port number, and a channel name must be known.

When step 503 determines that a connection has been established, then step 504 will send the request to the server, and step 505 will wait for a reply. When a reply arrives, step 506 reads it, and the reply is processed.

If step 508 determines that the reply is a "redirect" reply, then step 509 establishes a connection to the new server as indicated in the reply and control returns to step 503 to determine if the connection was successful.

If the reply was not a redirect reply, then step 510 determines if the reply was an "index required" reply. If it was an index required reply, then step 511 changes the optimized update request which was originally prepared in step 501 to a normal update request, and control is returned to step 502 to re-send the request.

If the reply was not an index required reply, then step 512 determines if it is an "update" reply. If it is an update reply, then step 513 appends the commands which are part of the update reply to the holding space on the client. If step 514 determines that the channel application is running, then the application is notified in step 515, otherwise the channel data is updated from the data in the holding space as indicated in step 517.

If the reply was none of the legal reply types, or if the connection failed, then an error is reported in step 516

Referring again to FIGS. 1A–1E, tuner process 152 running on client system 140, will store the commands which are part of an update reply in the holding log 156, which is part of the holding space 155. The data associated with the commands is stored in the data area 158 of the holding space 155. In the preferred embodiment, the processing of replies by tuner process 152 is a transactional process which means that it can be interrupted at any time without corrupting the holding space 155.

The holding space 155 is used to store data received as part of update replies. A holding index 157 is computed from channel index 160 and the commands in holding log 156. The holding index is computed by taking channel index 160 and applying the commands from the holding log 156 to it. The resulting holding index 157 is used instead of channel index 160 in further requests, so that data from multiple replies can be accumulated in the holding area.

The update reply commands are not immediately applied to channel 159 because the modification of program code or data may corrupt channel application 153 if that application is running at the time of the updates. Instead the changes from holding space 156 are applied either when channel application 153 terminates, or when channel application 153 explicitly requests so, thus bringing the channel 159 up to date. In the preferred embodiment the updating of channel data 161 from the holding space 155 is a transactional operation which means that it can be interrupted at any time without corrupting channel data 161.

When channel application 153 explicitly requests the update of channel data 161 from holding space 155 it must anticipate that channel data 161 will be changed by the tuner process 152 for the duration of the update. When the update is completed by tuner process 152, channel application 153 is notified, at which point it can safely load the new channel data 161 and integrate it into the running application 153. The update of channel data 161 as requested by the running channel application 153 can be selective so that only portions of the channel data 161 are updated.

Figure 6A:
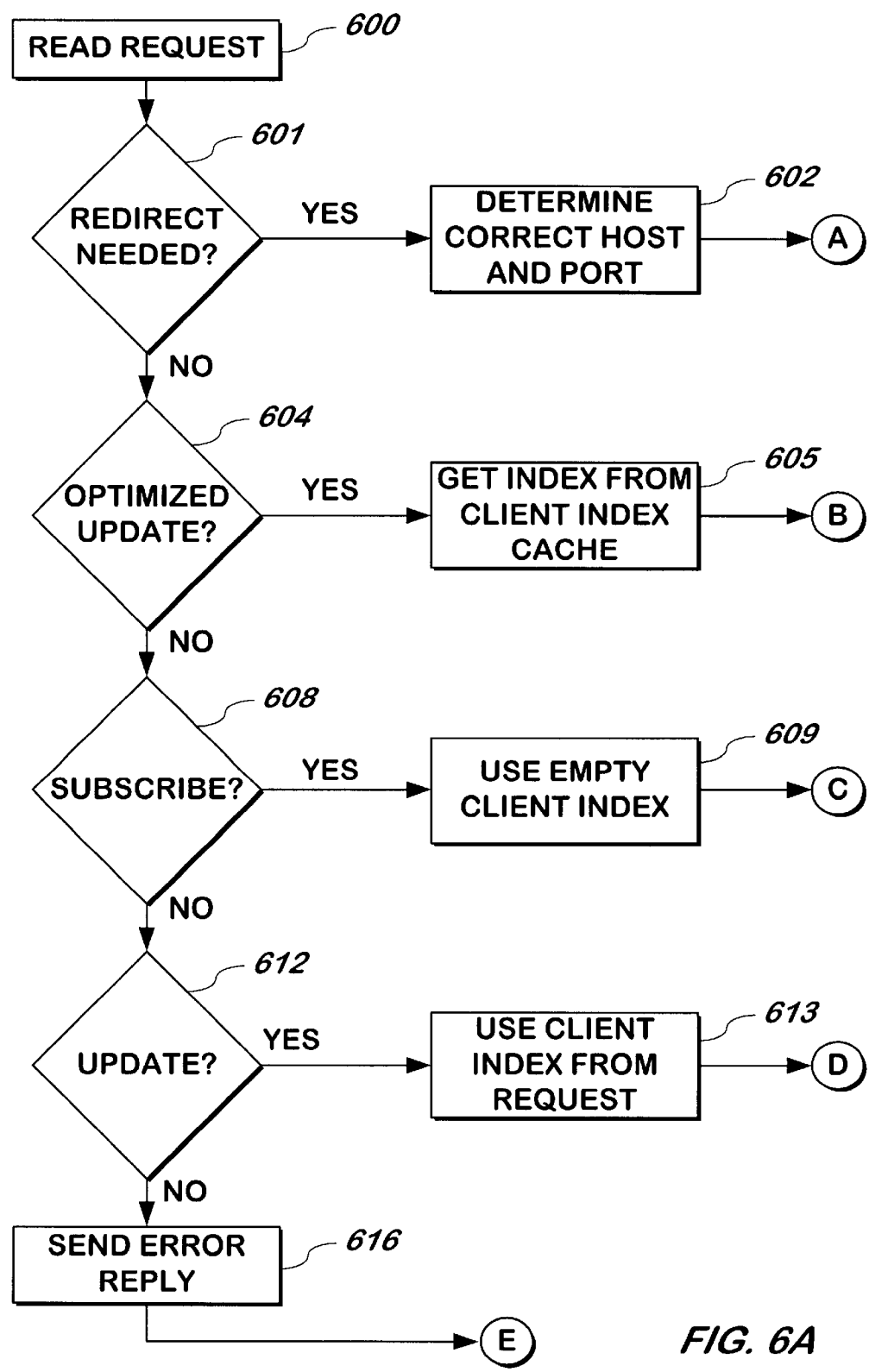
FIGS. 6A and 6B are a flow chart illustrating a method for processing a request by a server
Figure 6B:
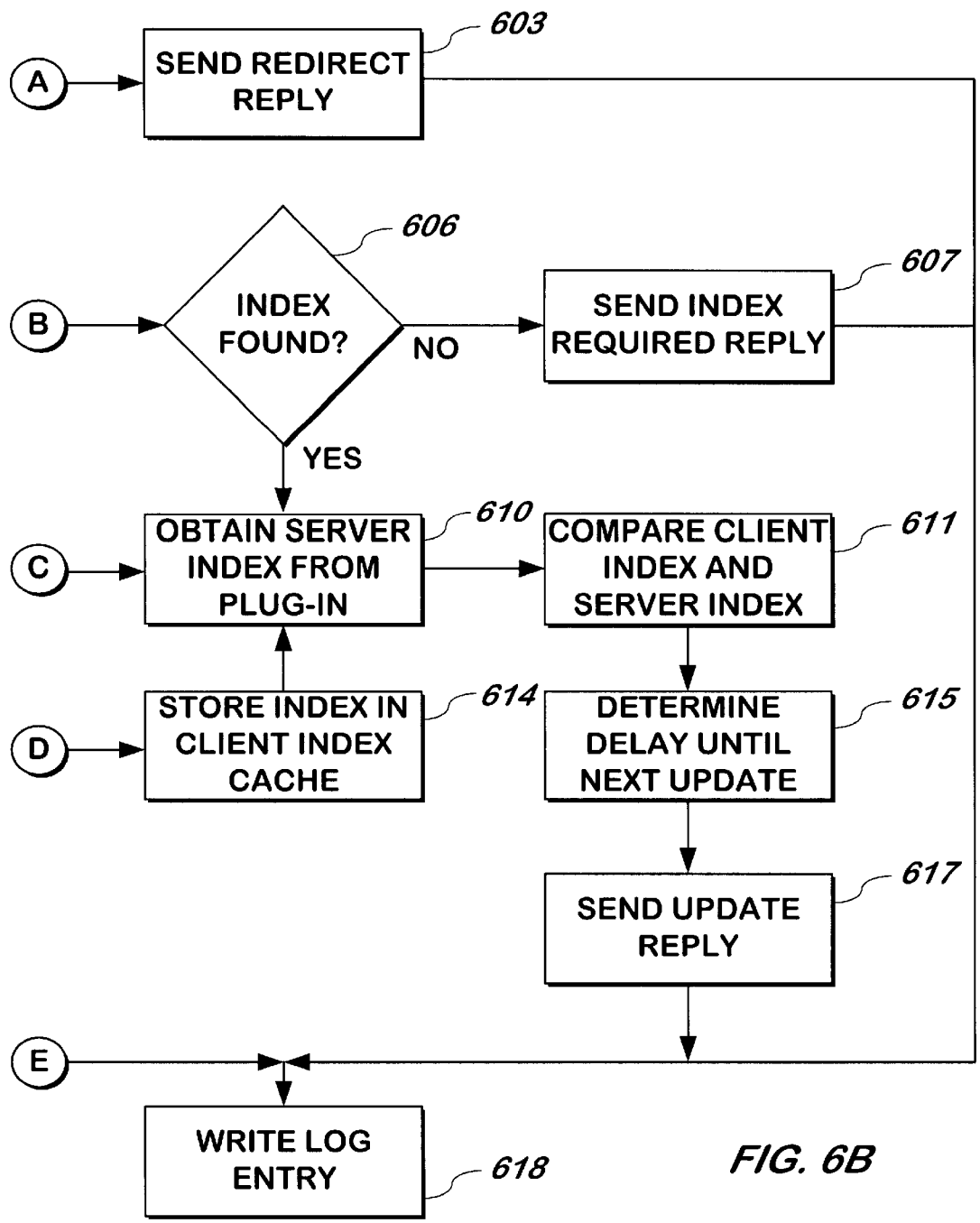

FIGS. 6A and 6B are a flow chart illustrating how a transmitter process responds to incoming requests from client systems. In step 600, a request is read from a client connection. Step 601 determines if a redirect is required. A redirect may be required if a server system exists which is located closer to the issuer of the request or if the current server process is too busy and wants to hand off some of the work load to another server process. If such a server exists, then step 602 determines the correct host and port and step 603 sends a redirect reply to the client. The client will re-issue the command to the server system indicated in the redirect reply.

If no redirect is required, then step 604 will check if the request was an optimized update request. If the request is an optimized update request, then step 605 looks up the index in the server's client index cache (shown as Index Cache 122 in FIG. 1) using the client index checksum from the optimized update request. If the index corresponding to the checksum in the optimized update request is found in the cache, then that index is used for subsequent processing. If step 606 determines that no index was found in the index cache, then step 607 will send an index required reply to the client. As a result the client will re-issue a normal update request to the server.

If the request was not an optimized update request and if step 608 determines that the request was a subscribe request, then step 609 will use an empty client index for subsequent processing.

If the request was not a subscribe request and if step 612 determines that it was an update request, then step 613 will use the client index from that update request. Step 614 stores the client index from this request in the client index cache. If other clients issue optimized update requests using this same index, and the index has not been purged from the index cache, then the optimized update request will succeed without receiving an "index needed" request. That is, the index to be used for subsequent processing will be retrieved from the index cache, thus greatly improving performance by reducing the need to repeatedly transmit the same client index from clients to servers. The use of an index cache takes advantage of the observation that many subscribers to a particular channel will have the same version of the channel index at any given time, and that many of those subscribers will request channel updates within a short period of time.

Once the client index is determined, then step 610 determines the correct server index to be used for subsequent processing. The server index may be retreived from channel index 132, or a transmitter plug-in may be invoked, as described in more detail below. Step 611 then compares the client index and server index using the method described in FIG. 2 and, as a result, a set of commands are generated. Next, step 615 determines the minimal delay until the next request, and step 617 sends the update reply.

The minimal delay until next request, as computed by step 615, is a hint to the client process which will receive the reply. The client should observe the suggested delay before issuing further requests for this channel thus making it is possible to reduce the load on the server system by increasing this delay. The default value for this delay is 0 minutes, allowing clients to decide when to reconnect.

If the request was not a valid request then step 616 will send an error reply. Finally each reply generated by steps 603, 607, 616, or 617, is logged in a log file by step 618 for future reference.

Referring back to FIGS. 1A–1E, transmitter process 121 on server system 110 may contain a plug-in code module 125 which is used to obtain the server channel index as part of the request handling method described in FIG. 6. A plug-in is a software program provided by the developer of a channel and can be used to create personalized or platform-specific channels.

Each channel can have a different plug-in 125 which can perform channel-specific actions as part of each request. Channel application 153 which is launched from channel data 161 can add data to subsequent requests, thus communicating information back to plug-in 125 which is running as part of transmitter process 121. In this way, low overhead communication between a client channel application 153 and a transmitter plug-in 125 is achieved.

When a request is received by transmitter process 121, plug-in code module 125 is used to process server channel index 132. If no plug-in is available, the server channel index 132 is used unmodified. Transmitter process 121 will call the plug-in 125, passing it the request, client channel index 160, and server index 132 as arguments. The plug-in code can process the data which is part of the request and perform appropriate actions.

Plug-in 125 can change channel index 132 and return a personalized version based on the request data. This modified version of the channel index is used in further request processing and, as a result, client channel 161 will reflect this modified structure rather than the original structure as described by channel index 132. Server channel index 132 serves as a template which is used by plug-in 125 to construct the appropriate channel application based on the data which was received as part of the request from client application 153. This way it is possible to efficiently personalize channels based on user choices.

For example, a financial portfolio channel may be personalized based on the stocks in a user's portfolio. The portfolio information is sent to the transmitter as part of each update request as request data, so that the plug-in for the portfolio channel can create a personalized channel index that contains data and code that is relevant with respect to the user's portfolio. The resulting update will create a channel on the client system that is personalized based on the end-user's choice of stocks.

Note that a copy of channel index 132 can be modified in memory without having to modify channel data 133 in storage system 126. This is possible because file nodes in a channel index contain a file pointer to the original data file in storage system 126. This way, parts can be added, deleted, or renamed in the in-memory copy of channel index 132 without actually modifying channel data 133.

Development system 170 is used by the developer of a channel to prepare and test channel data. The developer can use development tools 181, such as builders, compilers, editors, and debuggers, to create a channel application which is stored in storage system 183 as channel data 184. A developer may be developing more than one channel 184 simultaneously.

When a new version of channel data 184 is ready for distribution, administration tool 182 is used to transfer the changes to channel data 184 to channel data 133 on server system 110 using an install request. The install process is initiated when administration tool 182 contacts transmitter process 121 using network interface 171. Administration tool 182 then transfers the channel data 184 to transmitter process 121 as part of the install request. The transmitter process 121 the updates channel data 133 accordingly, and a new channel index 132 is computed. In the preferred embodiment the install process is transactional, which means that it can be interrupted at any time without corrupting channel data 133.

Administration tool 182 may be configured to ignore some parts of channel data 184 which are used only during development of the channel application such as source files and SCCS directories. Transmitter process 121 will only accept installation request on a special administration port which is accessible only to designated developers.

At any moment in time there can be many client systems 140 making requests to server system 110 and as a result many simultaneous client requests may be in progress in a multi-threaded fashion. As a result it is not possible to update channel data 133 immediately upon receiving an install request from a development system 170 since this may corrupt any ongoing client requests. During the processing an install request the transmitter process will suspend the processing of new client requests temporarily.

Client requests which are in progress at the time of the install request are completed, but transmitter process 121 will make sure that the required data files are transferred from channel data 133 into file cache 123, thus ensuring that changes to channel data 133 will not affect outstanding client requests. As soon as the install request has completed a new channel index 132 is computed and client request processing is resumed as usual.

During the processing of an install request, transmitter process 121 may decide to generate a "diff file" for a file which is updated as part of the install. This diff file can later be used to further reduce the overhead of an update request by transmitting only the differences between two files rather than their entire content. Transmitter process 121 decides whether a diff should be cached based on the original file content, the new file content, the size of the diff file compared to the size of the new file content, and the frequency at which this file has been updated in the past. If a diff is appropriate, it is stored in diff cache 124, using the checksum of the original file and the checksum of the new file as a key. The diff file is retrieved when comparing channel indices as described in FIG. 3.

The performance of the transmitter request handling can be improved by storing data files from channel data 133 in file cache 123 which is located in random access memory. Performance improvements are achieved because access times to random access memory are shorter than access times to most storage systems 126.

Client system 140 can potentially function as a server system for other clients, thus redistributing channel 159 to its clients. This mechanism can be used to distribute a channel to multiple server system, requests can now be distributed between these servers using redirect replies, thus balancing the load.

To improve the quality of service and to avoid corruption of data it is possible to implement the protocol in a transactional manner. The result is that when a request is partially completed due to a power failure or transmission failure, the resulting channel 159 on client system 140 is not corrupted. To make the protocol transactional tuner process 152 needs to implement a two-phase commit transaction handling mechanism which ensure that either all updates are applied entirely, or they or discarded when a request is partially completed Such transactional processing is well-known in the art.

In the presently preferred embodiment, the Java programming language is used to implement channels which are distributed to clients, because Java implements a strong security model. The Java security features allow tuner process 152 to impose security constraints on channel 159 and thus stop it from damaging or stealing information. In addition to Java's security, it is possible to authenticate a channel using encryption techniques such as RSA encryption or the SSL protocol. With the end-user's consent it is possible to label an authenticated channel as "trusted", thus allowing it more freedom to access the resources of client system 140. To authenticate a channel, transmitter process 121 must include a digital signature in each request which can be used by tuner process 152 to verify its authenticity.

The channel metaphor permits the application of various electronic billing mechanisms. Additional information can be added to each request which unambiguously identifies the end-user, so that transmitter system 110 can bill the end-user based on the usage of channel 159. Any existing billing system such as CyberCash, DigiCash, or Mondex could be used. A digital certificate can be included in each request to verify that the channel has been paid for by the end-user. Encryption technology such as RSA or SSL may be used to encrypt requests to protect the user against fraud.

A novel system and method for distributing computer application code and data to a plurality of users has been described. It will be understood by those skilled in the art, informed by this specification, that numerous modifications and additions can be made to the system described here ithout departing from the spirit and scope of the present invention. For example, tuner process 152 can function as a caching HTTP proxy server for web browser process 151. When the tuner process 152 receives an HTTP request for a file which is part of a subscribed channel it will respond with an HTTP reply and retrieve the data from channel data 161 in storage system 159 without requiring access to the network 101. This way a content provider can store a web-site, together with all related data, in a channel. Once the user has subscribed to this channel the web-site is accessible through web browser 151 even if client system 140 is not connected to network 101. Other modifications and additions will likewise be apparent. The present invention is, therefore, not to be limited to the system and method of the presently preferred embodiment described above, but shall be defined by reference to the following claims.

What is claimed is:

1. A method of providing at least a portion of a file stored in a first storage, comprising:
   receiving a first request describing the file;
   beginning transmission of the file responsive to the first request received;
   beginning to receive at least one new version of the file;
   receiving a second request describing the file before the new version of the file is substantially fully received;
   storing the second request received responsive to the beginning to receive step; and
   responsive to the completion of receipt of the new version of the file, transmitting at least a portion of the new version of the file responsive to the second request received.

2. A method of updating at least one first file, comprising:
   receiving at a first computer system an indicator of at least one first file; and
   responsive to the indicator received in a first set of at least one indicator:
      identifying as a candidate for modification at least one of the at least one first files corresponding to the indicator received;
      providing at least one second file responsive to the at least one first file identified; and
      transmitting from the first computer system to a second computer system instructions regarding building a single file comprising at least a portion of at least one of the first files identified and at least a portion of at least one of the second files provided.

3. The method of claim 2 wherein:
   the identifying step comprises, for each of a plurality of the first files identified, identifying a new file different from the first file identified; and
   at least one of the second files provided is different from the new file identified.

4. The method of claim 2, additionally comprising the steps of, responsive to the indicator received in a second set of at least one indicator:
   identifying at least one third file responsive to the indicator received; and
   providing at least one of the at least one third file identified.

5. A method of requesting an update to a first set of at least one file and a second set of at least one file, the method comprising:
   transmitting a first request for the update to the first set of at least one file;
   receiving the updated to the first set of at least one file, the update comprising an indicator of a period of delay;
   waiting a period of time responsive to the indicator received; and
   transmitting, after the waiting step, a second request for the update to the second set of files.

6. A method of providing an update for a set of at least one file, the method comprising:
   receiving from a device a request for the update to the set of at least one file;
   determining an indicator of a minimum period of time from which an additional request from the device is not desired;
   providing the update for the set of at least one file; and
   providing the indicator.

7. A method of applying an update to a set of at least one file, the method comprising:
   requesting the update to the set of at least one file;
   receiving a portion of the update requested;
   responsive to the portion of the update comprising all of the update, applying the update to at least one of the files in the set; and
   responsive to the portion of the update comprising less than all of the update, deleting the portion of the update received.

8. A method of requesting an update for a set of at least one file, the method comprising:
   transmitting to a first server a first request for an update for a set of at least one file;
   receiving an identifier of a second server responsive to the first request transmitted; and
   transmitting to the second server a second request for an update for a set of at least one file corresponding to the first request.

9. The method of claim 8 additionally comprising the steps of:
   receiving the update from the second server; and
   updating the set of files responsive to the update received.

10. A method of responding to a request for an update of a set of at least one file, the method comprising:
   receiving at a first server a first request to update a set of at least one file;
   providing an identifier of a second server;
   receiving at a second server a second request for the update of the set of at least one file corresponding to the first request received; and
   providing the update responsive to the second request.

11. The method of claim 1, additionally comprising completing the transmission of the file after the beginning to receive at least one new version of the file step.

12. The method of claim 1, wherein the first request comprises a request to update the file.

13. The method of claim 12 wherein the beginning transmission step comprises beginning transmission over an Internet.

14. The method of claim 5, wherein the update comprises a checksum.

15. The method of claim 5, additionally comprising the steps of:

receiving the second set of files requested; and installing at least one of the second set of files received.

16. The method of claim 6, additionally comprising the steps of:

receiving a second request for the update to the set of at least one file; and providing the update responsive to the second request.

17. The method of claim 7, additionally comprising, responsive to the portion of the update comprising less than all of the update, rerequesting the update to the set of at least one file.

18. The method of claim 10, wherein the providing the identifier of the second server step is responsive to a location of the second server.

19. The method of claim 18, wherein the providing the identifier of the second server step is additionally responsive to a location of an originator of the request.

20. The method of claim 10, wherein the providing the identifier of the second server step is responsive to a work load of the first server.

* * * * *